(12) United States Patent (10) Patent No.: US 12,413,789 B2
Radosavljevic et al. (45) Date of Patent: Sep. 9, 2025

(54) METHOD OR AN APPARATUS FOR ESTIMATING FILM GRAIN PARAMETERS

(71) Applicant: InterDigital CE Patent Holdings, SAS, Paris (FR)

(72) Inventors: Milos Radosavljevic, Rennes (FR); Edouard Francois, Bourg des Comptes (FR); Erik Reinhard, Hede-Bazouges (FR); Zoubida Ameur, Cesson-Sevigne (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 71 days.

(21) Appl. No.: 18/574,563

(22) PCT Filed: Jun. 30, 2022

(86) PCT No.: PCT/EP2022/068027
§ 371 (c)(1),
(2) Date: Dec. 27, 2023

(87) PCT Pub. No.: WO2023/275222
PCT Pub. Date: Jan. 5, 2023

(65) Prior Publication Data
US 2024/0323453 A1  Sep. 26, 2024

(30) Foreign Application Priority Data
Jul. 1, 2021 (EP) .................................. 21305914

(51) Int. Cl.
*H04N 19/117* (2014.01)
*H04N 19/176* (2014.01)
(Continued)

(52) U.S. Cl.
CPC ........... *H04N 19/86* (2014.11); *H04N 19/117* (2014.11); *H04N 19/176* (2014.11); *H04N 19/80* (2014.11)

(58) Field of Classification Search
CPC .... H04N 19/117; H04N 19/176; H04N 19/80; H04N 19/85; H04N 19/86
See application file for complete search history.

(56) References Cited

U.S. PATENT DOCUMENTS 5,641,596 A    6/1997  Gray et al.
7,738,721 B2   6/2010  Gomila et al.
(Continued)

OTHER PUBLICATIONS

Radosavljevic et al., "AHG9: Film grain estimation and film grain synthesis for VVC Film grain characteristics SEI message, film grain estimation and film grain synthesis modules", Joint Video Experts Team (JVET) of ITU-T SG 16 WP 3 and ISO/IEC JTC 1/SC 29/WG 11, Document: JVET-V0093-v3, 22nd Meeting, by teleconference, Apr. 20, 2021, 10 pages.

(Continued)

*Primary Examiner* — Jessica M Prince
(74) *Attorney, Agent, or Firm* — Condo Roccia Koptiw LLP

(57) ABSTRACT

At least a method and an apparatus are presented for efficiently processing film grain while encoding or decoding video. For example, the method comprises estimating film grain parameters for a plurality of image blocks in an image with film grain, wherein the film grain parameters comprise at least one scaling factor. The estimating further comprises obtaining a plurality of film grain blocks, a film grain block being representative of a film grain estimate in an image block; obtaining a plurality of filtered blocks, a filtered block being representative of an image block without film grain; and determining at least one scaling factor for the plurality of images blocks in the image wherein the at least one (Continued)

scaling factor is adapted to statistics based on the plurality of film grain blocks and on the plurality of filtered blocks.

22 Claims, 9 Drawing Sheets

(51) Int. Cl.
*H04N 19/80* (2014.01)
*H04N 19/86* (2014.01)

(56) References Cited

U.S. PATENT DOCUMENTS

| | | | |
|---|---|---|---|
| 7,738,722 B2 * | 6/2010 | Gomila | H04N 19/14 358/426.14 |
| 8,023,567 B2 | 9/2011 | Gomila et al. | |
| 8,472,526 B2 | 6/2013 | Gomila et al. | |
| 9,098,916 B2 | 8/2015 | Llach et al. | |
| 10,839,489 B2 | 11/2020 | Norkin | |
| 2007/0030996 A1 * | 2/2007 | Winger | G06T 1/0085 375/E7.199 |
| 2019/0066272 A1 * | 2/2019 | Norkin | G06T 3/20 |

OTHER PUBLICATIONS

"Infrastructure of audiovisual services—Coding of moving video—Information Technology—Generic coding of moving pictures and associated audio information: Video", International Telecommunication Union, Telecommunication Standardization Sector of ITU, Series H: Audiovisual and Multimedia Systems, Recommendation ITU-T H.262, Feb. 2000, 220 pages.

Oh et al., "Advanced Film Grain Noise Extraction and Synthesis for High-Definition Video Coding", Institute of Electrical and Electronics Engineers (IEEE), IEEE Transactions on Circuits and Systems for Video Technology, vol. 19, Issue 12, Dec. 2009, 13 pages.

Schallauer et al., "Rapid and Reliable Detection of Film Grain Noise", Institute of Electrical and Electronics Engineers (IEEE), 2006 International Conference on Image Processing, Atlanta, Georgia, USA, Oct. 8, 2006, 4 pages.

Gomila et al., "SEI message for film grain encoding: syntax and results", Joint Video Team (JVT) of ISO/IEC MPEG & ITU-T VCEG (ISO/IEC JTC1/SC29/WG11 and ITU-T SG16 Q.6), Document: JVT-1013, PExt AHG Meeting, Trondheim, Norway, Jul. 2003, 9 pages.

Gomila et al., "SEI message for film grain encoding", Joint Video Team (JVT) of ISO/IEC MPEG & ITU-T VCEG (ISO/IEC JTC1/SC29/WG11, ITU-T SG16 Q.6), Document: JVT-H022, 8th Meeting, Geneva, Switzerland, May 23, 2003, 14 pages.

"Infrastructure of audiovisual services—Coding of moving video—Versatile Video Coding", International Telecommunication Union (ITU), ITU-T Telecommunication Standardization Sector of ITU, Series H: Audiovisual and Multimedia Systems, Recommendation ITU-T H.266, Aug. 2020, 516 pages.

"Infrastructure of audiovisual services—Coding of moving video—Versatile supplemental enhancement information messages for coded video bitstreams", International Telecommunication Union, ITU-T Telecommunication Standardization Sector of ITU, Series H: Audiovisual and Multimedia Systems, Recommendation H.274, Aug. 2020, 86 pages.

"Infrastructure of audiovisual services—Coding of moving video—Reference software for ITU-T H.265 high efficiency video coding", International Telecommunication Union, ITU-T Telecommunication Standardization Sector of ITU, Series H: Audiovisual and Multimedia Systems, Recommendation ITU-T H.265.2, Oct. 2014, 12 pages.

"Transmission of Non-Telephone Signals: Information Technology—Generic Coding of Moving Pictures and Associated Audio Information: Systems", International Telecommunication Union, Telecommunication Standardization Sector of ITU, Recommendation ITU-T H.222.0, Jul. 1995, 135 pages.

Schlockermann et al., "Film grain encoding in H264 AVC", Joint Video Team (JVT) of ISO/IEC MPEG & ITU-T VCEG (ISO/IEC JTC1/SC29/WG11 and ITU-T SG16 Q6), 9th Meeting, Sep. 2, 2003, San Diego, California, USA, 8 pages.

Radosavljevic et al., "AHG9: Enhancement of film grain parameter estimation for different intensity intervals", Joint Video Experts Team (JVET) of ITU-T SG 16 WP 3 and ISO/IEC JTC 1/SC 29/WG 11, Document: JVET-W0072, 23rd Meeting, by teleconference, Jul. 7, 2021, 6 pages.

McCarthy et al., "AHG17: Illustration of the film grain characteristics SEI message for VVC", Joint Video Experts Team (JVET) of ITU-T SG 16 WP 3 and ISO/IEC JTC 1/SC 29/WG 11, Document: JVET-R0359-v2, 18th Meeting, by teleconference, Apr. 15, 2020, 4 pages.

McCarthy et al., "Illustration of the film grain characteristics SEI message in HEVC", Joint Collaborative Team on Video Coding (JCT-VC) of ITU-T SG 16 WP 3 and ISO/IEC JTC 1/SC 29/WG 11, Document: JCTVC-AM0023-v1, 39th Meeting, by teleconference, Apr. 18, 2020, 4 pages.

"Infrastructure of audiovisual services—Coding of moving video—Advanced video coding for generic audiovisual services", International Telecommunication Union, Telecommunication Standardization Sector of ITU, Series H: Audiovisual and Multimedia Systems, Recommendation ITU-T H.264, Feb. 2014, 790 pages.

Llach, Joan, "Film Grain Technology—Specifications for H.264, MPEG-4 AVC Bitstreams", Society of Motion Picture and Television Engineers (SMPTE), RDD May 2006, Mar. 6, 2006, 18 pages.

\* cited by examiner

METHOD OR AN APPARATUS FOR ESTIMATING FILM GRAIN PARAMETERS

CROSS REFERENCE TO RELATED APPLICATIONS

This application is a U.S. National Stage Application under 35 U.S.C. § 371 of International Patent Application No. PCT/EP2022/068027, filed Jun. 30, 2022, which is incorporated herein by reference in its entirety.

This application claims priority to European Application No. 21305914.0, filed Jul. 1, 2021, which is incorporated herein by reference in its entirety.

TECHNICAL FIELD

At least one of the present embodiments generally relates to a method or an apparatus for film grain parameter estimation in video coding, video distribution and video rendering, and more particularly, to a method or an apparatus for estimating film grain parameters, for example a scaling factor (or scaling factors if more than one are estimated), as part of the film grain parametrized model, in order to adjust the intensity of the film grain to the local image intensity.

BACKGROUND

Film grain is often a desirable feature in video production, creating a natural appearance and contributing to the expression of creative intent. Film grain, however, does not compress well with modern video compression standards, such Versatile Video Coding (VVC) also known as ITU-T H.266 and ISO/IEC 23090-3. Indeed, within various filtering and lossy compression steps, film grain is suppressed without the possibility of reconstructing it. However, information on film grain can be communicated as metadata through for instance an SEI message specified by Versatile Supplemental Enhancement Information (VSEI, also known as ITU-T Recommendation H.274 and ISO/IEC 23002-7). Thus, film grain is often modeled and removed prior to compression, and it is resynthesized on the decoder side with the aid of appropriate metadata. In addition, film grain can also be used as a tool to mask coding artifacts resulting from the compression. Different approaches have been studied for film grain modeling. In the context of VVC, to restore the film grain in the compressed video, a frequency filtering solution to parametrize and resynthesize film grain can be used.

Existing methods and related literature typically cover the film grain synthesis part that is placed at the decoder side of the video distribution chain. In many cases, a person skilled in the art provides a manually selected set of film grain parameters. Those parameters can be tuned to simulate a specific film grain pattern, to simulate a different film grain intensity, etc.

However, an automatic method to analyze film grain and to estimate film grain parameters is desirable feature, especially considering the huge amount of new video data streamed over the network. Automatic analysis would allow a much wider use of film grain modeling, and it can provide more precise parameters of the model (instead of relying on human skill to evaluate film grain). However, automatic approaches for film grain analysis and parameter estimation are rarely studied and described in the related literature. Therefore, there is a need to provide state-of-the-art methods to estimate film grain parameters for, in this case, a frequency filtering model.

The invention proposes methods to estimate scaling parameter(s) of the frequency filtering model that are subsequently used for film grain synthesis. The estimation is based on the original video content. By using scaling parameter(s) estimated in such a way, it is possible to resynthesize film grain appearance close to the one from the original video content, e.g., before filtering and/or compression. In addition, estimated scaling parameter(s) can be automatically tuned based on the level of distortions introduced by the compression, e.g., based on the quantization parameter (Qp) value.

SUMMARY

The drawbacks and disadvantages of the prior art are solved and addressed by the general aspects described herein.

According to a first aspect, there is provided a method. The method comprising estimating film grain parameters for a plurality of image blocks in an image with film grain, wherein the film grain parameters comprise at least one scaling factor. The estimating further comprises obtaining a plurality of film grain blocks, a film grain block being representative of a film grain estimate in an image block; obtaining a plurality of filtered blocks, a filtered block being representative of an image block without film grain; and determining at least one scaling factor for the plurality of images blocks in the image wherein the at least one scaling factor is adapted to statistics based on the plurality of film grain blocks and on the plurality of filtered blocks.

According to another aspect, there is provided an apparatus. The apparatus comprises one or more processors, wherein the one or more processors are configured to implement the method for estimating film grain parameters according to any of its variants. According to another aspect, the apparatus comprises means for obtaining a plurality of film grain blocks, a film grain block being representative of a film grain estimate in an image block; means for obtaining a plurality of filtered blocks, a filtered block being representative of an image block without film grain; means for determining statistics based on the plurality of film grain blocks and on the plurality of filtered blocks; and determining at least one scaling factor for the plurality of images blocks in the image wherein the at least one scaling factor is adapted to determined statistics.

According to another general aspect of at least one embodiment, there is provided a device comprising an apparatus according to any of the decoding embodiments; and at least one of (i) an antenna configured to receive a signal, the signal including the video block, (ii) a band limiter configured to limit the received signal to a band of frequencies that includes the video block, or (iii) a display configured to display an output representative of the video block.

According to another general aspect of at least one embodiment, there is provided a non-transitory computer readable medium containing data content generated according to any of the described encoding embodiments or variants.

According to another general aspect of at least one embodiment, there is provided a signal comprising video data generated according to any of the described encoding embodiments or variants.

According to another general aspect of at least one embodiment, a bitstream is formatted to include data content generated according to any of the described encoding embodiments or variants.

According to another general aspect of at least one embodiment, there is provided a computer program product comprising instructions which, when the program is executed by a computer, cause the computer to carry out any of the described encoding/decoding embodiments or variants.

These and other aspects, features and advantages of the general aspects will become apparent from the following detailed description of exemplary embodiments, which is to be read in connection with the accompanying drawings.

BRIEF DESCRIPTION OF THE DRAWINGS

In the drawings, examples of several embodiments are illustrated.

DETAILED DESCRIPTION

It is to be understood that the figures and descriptions have been simplified to illustrate elements that are relevant for a clear understanding of the present principles, while eliminating, for purposes of clarity, many other elements found in typical encoding and/or decoding devices. It will be understood that, although the terms first and second may be used herein to describe various elements, these elements should not be limited by these terms. These terms are only used to distinguish one element from another.

The various embodiments are described with respect to the encoding/decoding of an image. They may be applied to encode/decode a part of image, such as a slice or a tile, a tile group or a whole sequence of images.

Various methods are described above, and each of the methods comprises one or more steps or actions for achieving the described method. Unless a specific order of steps or actions is required for proper operation of the method, the order and/or use of specific steps and/or actions may be modified or combined.

At least some embodiments relate to a method for estimating film grain parameters representative of an original content with film grain wherein, among the film grain parameters, the scaling factors or the intensity intervals are adapted to statistics of an original content with film grain. The method for estimating film grain parameters for instance implemented in a video encoding scheme. The estimated film grain parameters could then be used in a method for synthesizing film grain for instance implemented in a video decoding scheme.

Figures 1, 2:
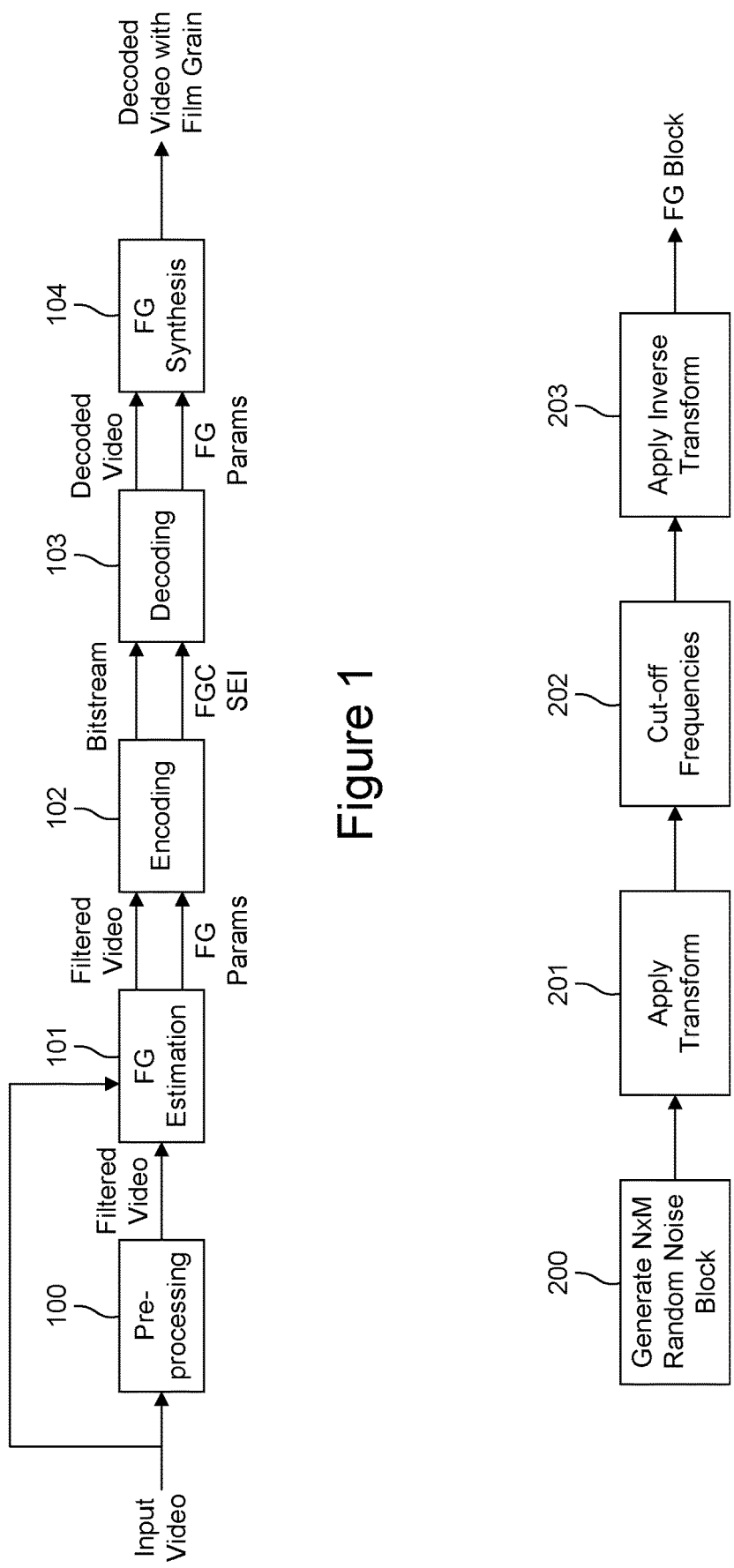
FIG. 1 illustrates a simplified block diagram of the film grain usage in a video coding/decoding framework in which various aspects of the embodiments may be implemented.
FIG. 2 illustrates a simplified block diagram of a method for generating blocks of film grain pattern in a video coding/decoding framework in which various aspects of the embodiments may be implemented.

FIG. 1 illustrates a simplified block diagram of the film grain usage in a video coding/decoding framework. Film grain is a pleasant noise that enhances the natural appearance of video content. It is created during the physical process of exposure and development of photographic film. However, digital sensors do not undergo such processes and are therefore free of film grain. This generates noiseless digital video, whose perfection, clear and pronounced edges and monotonous regions can worsen the subjective experience of the viewer. Therefore, re-noising the video can improve the visual experience and content creators often use it before distributing the content. This is especially accepted by the movie industry, where many creators turn to the technology of adding film grain to video content to add texture and warmth to their video, or sometimes create a sense of nostalgia. In addition, film grain can be used to mask compression artifacts even if it is not present in source video. Compression is an inevitable step in supporting the growing demands for the distribution of new content to end-users whose demands to increase the resolution and quality of the reproduced video yield huge amounts of data to be delivered. It is a huge burden for today's networks. It should therefore be noted that, prior to delivery, video is subjected to various pre-processing steps, where the inevitable video compression is presented. However, within the various steps of filtering and lossy compression, the film grain is suppressed without the possibility of reconstructing it. One way to alleviate this problem is to use lower quantization parameter (Qp) to better preserve fine details such as film grain. However, this can greatly increase the bitrate. Another solution is to model the film grain before compression, which can later be re-synthesized on the decoder side.

Therefore, since the film grain is considered as a desirable noise, it should be preserved during compression. This is not an easy task, because the film grain is known to have high levels at high frequencies (for example, in the DCT domain), which is usually suppressed by the quantization process. In order to preserve the look of film grain, and at the same time to improve coding efficiency, parameterized models are used to re-synthesize film grain. In addition, film grain is removed by filtering during the pre-processing step and/or suppressed by compression. Therefore, it is more efficient to use a parameterized film grain model, pre-define or estimate on-fly its parameters, remove film grain by various pre-processing steps and/or during the compression, and synthesize it back into video content after decompression. In this way, the film grain parameters are transmitted to the user side (decoder) via appropriate metadata, e.g., via SEI message.

The final benefits of modeling film grain are:

1) The final bitrate can be lower since we do not need to strictly preserve film grain after the compression;
2) The final bitrate can be improved if film grain is filtered out before compression since it is temporally uncorrelated, so prediction can be improved;
3) The visual quality of the reconstructed data is higher since we can model film grain as it was in the original content (even low QP values during the compression are going to suppress film grain);
4) Even if it was not present in the original content, film grain can improve visual quality and it can mask compression artefacts.

In general, film grain modeling for video coding consists of two parts, one placed at the encoder side, and another one at the decoder side. These two parts are: 1) film grain analysis and parameter estimation at the encoder; and 2) film grain synthesis at the decoder side according to received metadata. One of the possible models for film grain parametrization and synthesis is presented in "*Film Grain Technology—Specifications for H. 264|MPEG-4 AVC Bitstreams*." by Joan Llach, also known as SMPTE-RDD5. It is to note that it describes bit-accurate film grain model to add film grain to the decoded frames (hence defines film grain synthesis methodology). Nevertheless, conclusions about the encoder/parameter estimation side can be implicitly derived. A simplified block diagram of the overall process is depicted in FIG. 1. A pre-processing step 100 is first applied to the input video. It produces filtered video, however additional data can be produced, e.g., edge mask. The filtered video together with an input (original) video go through the film grain estimation step 101. This step generates film grain (FG) parameters. Steps 100 and 101 are part of the film grain analysis module. The video is encoded in step 102, and the FG parameters are inserted in film grain characteristics (FGC) SEI messages. The decoder in step 103 decodes the bitstream as well as the FGC SEI messages. It generates the decoded video, that can be further enhanced in step 104 by the FG synthesis process. Note that steps 100 and 101 can be skipped if required and replaced by a fixed set of manually tuned parameters. Also, step 104 can be skipped, producing only decoded video without adding film grain.

This disclosure complies with the presented model and provides methods related to the FG estimation. The methods proposed here can be used with/within the video coding standards, and they can produce film grain scaling parameter(s) fully compatible with the SEI message specification of modern video coding standards, e.g., VVC. However, the methods proposed here are not only limited to VVC and can be used with other video coding standards, and also in applications other than video coding. It is also to note that SMPTE-RDD5 represents just one of the possible implementations of the frequency-filtering approach for film grain. The approach is also described in various U.S. patents such as U.S. Pat. Nos. 7,738,721, 9,098,916, 8,023,567, or U.S. Pat. No. 8,472,526. For example, U.S. Pat. No. 9,098,916 provides schematic diagrams for several implementation variants.

However, the specific implementations of the scaling parameter(s) estimation process for frequency filtering model are not provided in the related literature.

To understand the techniques of film grain analysis and parameter estimation, a brief overview of film grain synthesis based on frequency filtering model will prove helpful.

It is important to note that VVC's FGC SEI specification only provides the syntax to transmit parameters of the model to the decoder side, but neither provides the methods to estimate them nor how to synthesize film grain. Work in SMPTE-RDD5 provides closer a look to the synthesis part (placed at the decoder side). Although it is defined for the H.264 standard, no modifications are needed for VVC or HEVC since both support the same metadata. The only minor modifications are needed to support bit depths higher than 8-bit.

The model described here is based on filtering in the frequency/transform domain which includes filtering of the random noise to simulate the film grain pattern. By this model, film grain patterns are modeled in the frequency domain by using a pair of cut-off frequencies that define a low-pass filter. Even if this disclosure is described by using low-pass filtering to model film grain pattern, a person skilled in the art can conclude that in some embodiments different types of filtering can be used. For example, instead of low pass filtering that is represented by two cut-off frequencies (horizontal high cut-off and vertical high cut-off) as it is going to be described, one can use band pass filtering. In that case four different frequencies (vertical high cut-off, vertical low cut-off, horizontal high cut-off, and horizontal low cut-off frequency) are used to define the film grain pattern. One can conclude that other types of filtering can be used for the purpose of creating film grain patterns in the frequency domain.

To synthesize a desired film grain pattern, two parameters must be set or estimated, e.g., communicated to the synthesis part (decoder) via appropriate SEI message. Those parameters represent horizontal high cut-off frequency (noted Horizontal_Cutoff) and vertical high cut-off frequency (noted Vertical_Cutoff), which in turn characterize/define film grain pattern (film grain look—shape, size, etc.). Thus, each film grain pattern is synthesized using a different pair of cut-off frequencies according to the frequency filtering model. If no parameters are transmitted via SEI message, one can agree upon default parameters, if the synthesis part is enabled for the decoded frame.

Additional scaling based on the scaling parameter that is also sent to the decoder (e.g., a parameter in the SEI message) can be performed to get the appropriate intensity of the film grain. After obtaining the film grain parameters, simulation of the film grain in accordance with the received parameters can occur.

FIG. 2 illustrates a simplified block diagram of a method for generating block of film grain patterns according to a general aspect of at least one embodiment. It begins by defining a N×M block of pseudo-random numbers that follow the Gaussian distribution in step 200. To obtain a block of pseudo-random numbers, one can utilize any Gaussian random number generator already established in the literature. A block of pseudo-random numbers can be obtained on-fly, or it can be defined in advance and stored for further use, e.g., during an initialization step as described in the above-mentioned US patent. The film grain pattern is then simulated as follows.

Block b of N×M pseudo-random values, which have been generated with a normalized Gaussian distribution N(0,1), undergoes a low-pass filtering which is performed in the frequency domain by the following:
1. Transform: B=DCT(b) (step 201)
2. Frequency filtering-low pass: (step 202)

```
for (x=0; x<N; x++) {
    for (y=0; y<M; y++) {
        if (x>Horizontal_Cutoff || y>Vertical_Cutoff) {
            B[x,y] = 0;
        }
    }
}
```

3. Inverse transform: b'=Inverse_DCT(B) (step 203)

Where b' represents the generated film grain pattern/block. Note that N and M can take any value, however in practice it is shown that N=M and size of 64×64 are usually employed. The previous example is described with a particular transform implementation based on a DCT, although another transform can be used, e.g., Fast Fourier Transform. Also, different variants of DCT (including the standardized VVC's transform) can be utilized at this step. Thereafter, each block b' represent N×M film grain pattern that is used to add grain to the decoded frame. Different film grain patterns (for different cut-off pairs) can be pre-computed-creating a database of available film grain patterns—or they can be calculated on-the-fly as each decoded frame is ready to be processed.

At the end, additional operations may be applied after obtaining b', such as scaling or deblocking as described in SMPTE-RDD5.

After creating a film grain pattern (block b'), a scaling to the proper intensity based on the scaling factor (SF) can be performed. It determines the level at which the film grain will be perceived at the final image, and by doing that we ensure that the film grain is simulated at the correct scale. The scaling factor is typically communicated to the decoder (FG synthesis part) in a same manner as cut-off frequencies (e.g., via film grain SEI message). The final synthesized film grain block is then:

$$FG\_block = SF * b'$$

Thus, the film grain is added to the image on a block basis. For example, the film grain can be added to the image using 8×8 (or 16×16) blocks randomly selected from the FG_block (e.g., size 64×64) created in the previous step. In some cases, the pseudo-random number generator is used to define an offset from the origin of 64×64 block in order to ensure bit-exact simulation. The reasoning to add film grain to the image on an 8×8 block basis instead to directly add film grain by using the full FG_block (in our example 64×64 but not limited to that size only) is to ensure randomness of the film grain when added to the image (since film grain is random noise and repeating patterns in an image can lead to a lower quality in terms of subjective visual performance).

Finally, an input image can be processed block by block in raster order or in any other convenient way.

In some cases, deblocking can be performed as well to smooth the edges.

In one embodiment, one set of film grain parameters (cut-off frequencies and scaling factor) are applied to the complete input image. In another embodiment, for different intensity levels of an image, different film grain parameters may be applied. Different sets of parameters (cut-off frequencies and scaling factors) can be used for different color components as well. Hence, in a more general embodiment, film grain depends on the local intensity of an image and different components can have different grain parameters.

For example, the SMPTE-RDD5 model defines intensity intervals and each interval is associated with one set of film grain parameters (Horizontal_Cutoff, Vertical_Cutoff and scaling factor). Each interval is defined with the two variables intensity_interval_lower_bound and intensity_interval_upper bound. Exceptionally, the intervals cannot overlap according to the specification, meaning that the intensity_interval_upper_bound[i]<intensity_interval_lower_bound[i+1] needs to be satisfied for all intensity intervals, where i is the index of the interval (upper bound of an interval needs to be smaller than the lower bound of the next interval). In order to choose which set of parameters should be selected for the film grain synthesis process, one can take advantage of the block average to find the interval to which the average value of the currently processed block belongs (the currently processed block is the block to which we add a film grain and is taken from the image we are processing—usually a decoded frame). Based on the average value of the block, we can apply the parameters corresponding to that interval during the film grain simulation. Film grain parameters are then selected for each processed block based on its average, individually. Below is provided one example based on SMPTE-RDD5. First, a syntax of the model is provided in the table below.

TABLE 1

Syntax of the SMPTE-RDD5 model

```
for ( c = 0; c < 3; c++ )
    comp_model_present_flag[ c ]
for ( c = 0; c < 3; c++ ) {
    if ( comp_model_present_flag[ c ] ) {
        num_intensity_intervals_minus1[ c ]
        num_model_values_minus1[ c ]
        for ( i = 0; i <= num_intensity_intervals_minus1[ c ]; i++ ) {
            intensity_interval_lower_bound[ c ][ i ]
            intensity_interval_upper_bound[ c ][ i ]
            for ( j = 0; j <= num_model_values_minus1[ c ]; j++ )
                comp_model_value[ c ][ i ][ j ]
        }
    }
}
```

In the provided syntax example, c is the color component index. Film grain is added to the component if comp_model_present_flag[c] flag is set to true, otherwise the color component is not processed in the film grain synthesis. Thereafter, for each active component we have a number of intensity intervals num_intensity_intervals_minus1[c] and a number of model values num_model_values_minus1[c]. Typically, we have 3 model values (Horizontal_Cutoff, Vertical_Cutoff and scaling factor), but in some cases it can be fewer, in which case missing parameters are implicitly derived. Then, for each intensity interval we have lower bound intensity_interval_lower_bound[c][i] and upper bound intensity_interval_upper_bound[c][i] (typically intervals cannot overlap). For each interval, we have three parameters (explicitly defined or implicitly derived). Finally, parameters of the film grain take the following form:

TABLE 2

One example of film grain parameters for SMPTE-RDD5 model

| Intensity interval # | Lower bound | Upper bound | Horizontal_Cutoff | Vertical_Cutoff | Scale Factor |
|---|---|---|---|---|---|
| 1 | 10 | 80 | 8 | 8 | 20 |
| 2 | 81 | 120 | 8 | 7 | 30 |
| 3 | 121 | 190 | 10 | 10 | 40 |
| 4 | 191 | 240 | 10 | 10 | 20 |

For SMPTE-RDD5 and the previous example, there are 4 intensity intervals. The model's scale factor according to the SMPTE-RDD5 is therefore represented as a piece-wise constant function.

Figure 3:
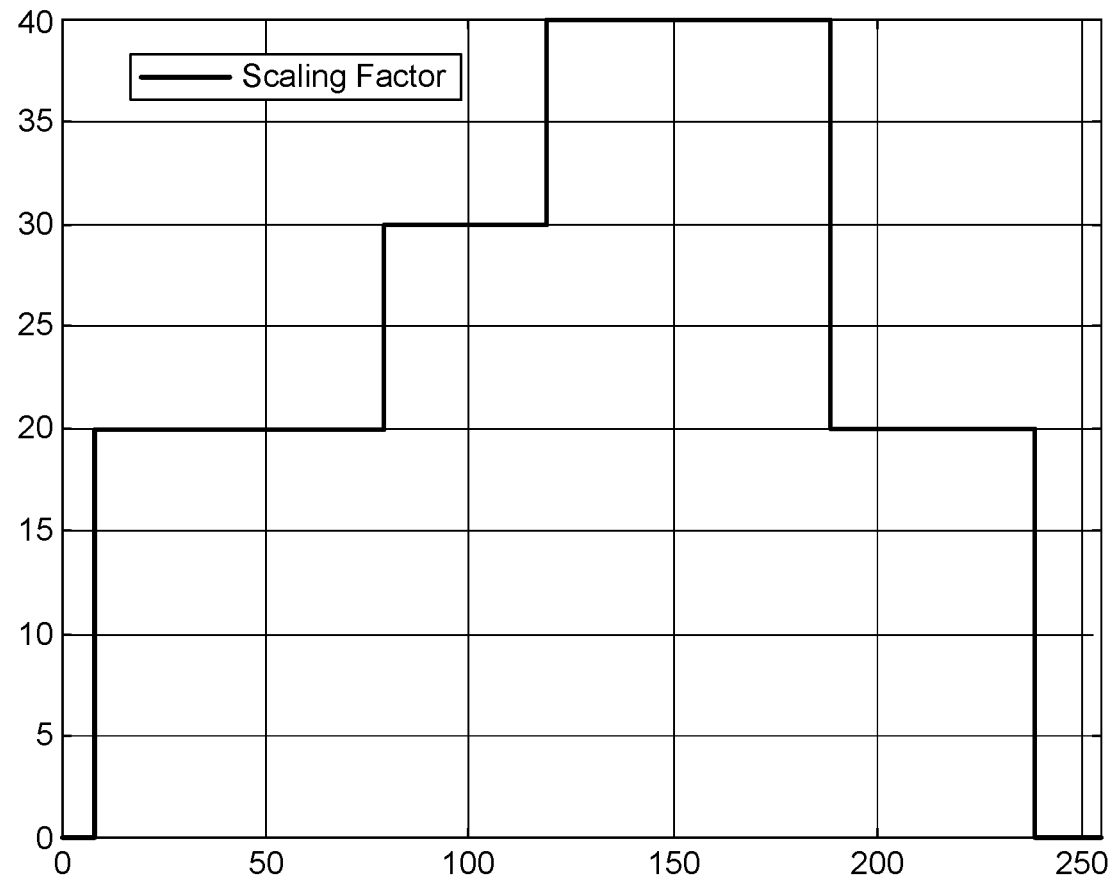
FIG. 3 illustrates a piece wise constant scaling function for film grain in a video coding/decoding framework.

FIG. 3 illustrates an example of a piece wise constant scaling function used in a video coding/decoding framework, for instance as described in SMPTE-RDD5. Note that missing intervals, for example, from 0 to 10 in Table 2, do not have associated parameters. It means that film grain is not simulated for those intensity levels. The present principles are not limited to this exemplary scaling function, as the scaling functions compatible with the present principles cannot all be listed, but a person skilled in the art can see other various variants on this topic.

Film grain synthesis thus typically occurs independently for each color component.

The methods described above are fully supported and compatible with VVC's SEI message for film grain, as well with previous SEI messages, e.g., for HEVC or for H.264/AVC. Also, even if the presented methods are described within the context of video coding and video distribution, they are not limited to this particular scenario and other applications may occur. Further, even if the methods may be described in the context of VVC, other standards such as HEVC or H.264/ACV among others also can utilize the described methods.

In another embodiment, a fixed set of manually tuned parameters is used (for example, provided in a configuration file), in which case the film grain analysis and parameter estimation processes are not used at the encoder side.

However, in a variant embodiment, film grain analysis and parameter estimation process are used. It creates information indicative of the film grain if any present in the input video.

Advantageously, the present principles are implemented the embodiment applying film grain analysis and film grain parameter estimation.

Figure 4:
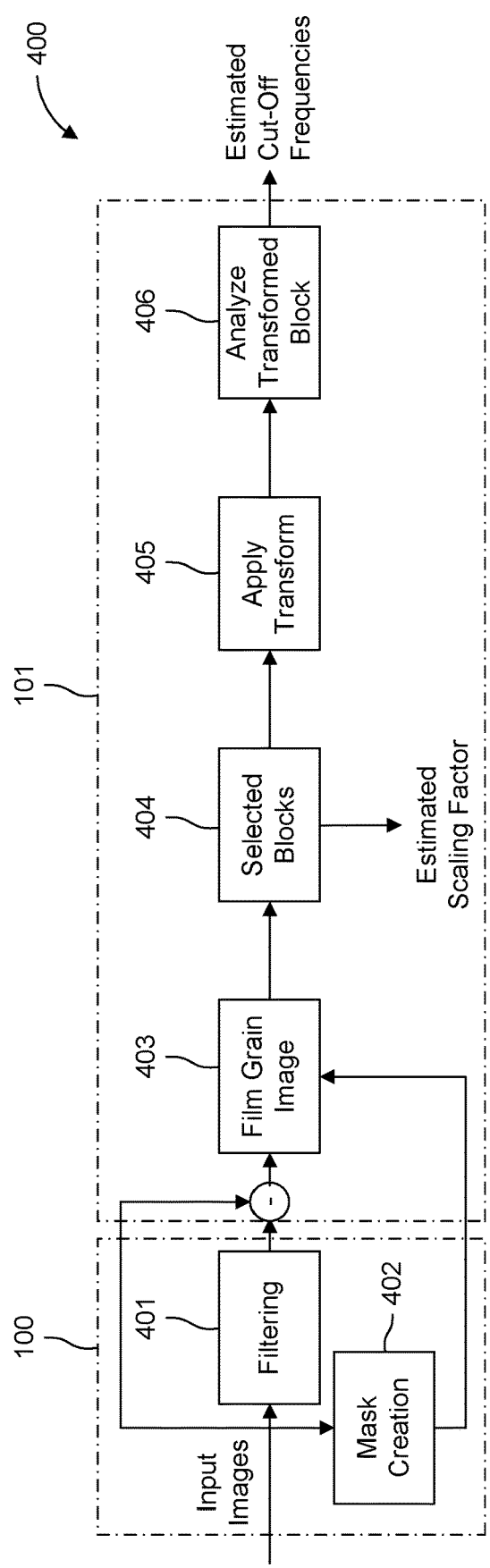
FIG. 4 illustrates a block diagram of a method for estimating film grain parameters according to a general aspect of at least one embodiment.

FIG. 4 illustrates a block diagram 400 of a method for estimating film grain parameters according to a general aspect of at least one embodiment. In the embodiment of FIG. 4, cut-off frequencies and scaling factor(s) are estimated from real data, on-the-fly as illustrated in FIG. 1 by reference to blocks 100 and 101. This method 400 is optional in a general film grain framework as film grain can be synthesized from a fixed set of parameters, however if one wants to replicate the original film grain look it is desirable to precisely estimate its parameters rather than to use parameters that are defined a priori.

To accomplish the film grain analysis task, additional operations 401, 402 are performed as shown in FIG. 4. Operations 401, 402 are for instance part of the pre-processing step 100 shown on FIG. 1. According to a particular variant, a denoising, or more generally a filtering 401, is applied to remove film grain from the original content (input image) resulting in a filtered image. Such denoising or filtering can utilize any algorithm capable of reducing noise in the processed images. In case the observed input video does not have a film grain, the denoising process 401 is advantageously skipped (and in some cases the whole process of film grain parameter estimation 400 is skipped). In some cases, instead of performing filtering, the method uses the reconstructed images after compression (since film grain is going to be suppressed by compression). However, in that case additional artefacts resulting from compression can interfere with the estimation process.

Once both the input image with film grain and the filtered image without film grain are available, the process for estimating film grain parameters starts. According to a particular variant, the estimation is performed only on a flat region of an image. It means that an additional pre-processing, e.g., edge detection or detection of complex texture regions 402, may also be performed in the pre-processing step 100 to obtain a mask image. In such a way, information on the image complexity is obtained, and film grain parameters are typically estimated only on flat and low-complexity parts of an image (indicated by the mask). By doing so, more precise estimation of the film grain parameters is performed. Although detection of the flat and low texture complexity regions is optional, this detection highly influences the performance of film grain estimation. On the other hand, the algorithms to get such edges or textures information are abundant. The present principles are not limited to any specific algorithm that can provide information on edges or textures within the observed frame.

Thereafter, the process of parameter estimation 101 continues with determining the difference between the original input and the filtered image. By doing so, the film grain is extracted from the input image and results into a film grain image 403, also referred to as film grain estimate. Thereafter, N×M blocks are selected for further processing 404. Note that N×M blocks are selected in the raster order but other implementations remain possible. The scanning of the N×M blocks is done until all the available blocks of an image are not analyzed. In some circumstances, scanning can be terminated early if a sufficient number of N×M blocks are already processed and are available in the estimation process.

Note in addition, the film grain pattern in such a case is an N×M residual block obtained by subtracting the original and filtered block at the given position, and which is taken at the flat image region (indicated by mask 402) since edges and complex textures can lead to a wrong estimation.

Yet in a step 404, film grain patterns (blocks selected in 404) are directly analyzed to estimate scaling factor(s). At least one embodiment for scaling factor estimation is described hereafter according to various embodiments. In a subsequent step film grain patterns are then input to the transforming process 405, e.g., DCT, in order to receive a set of transforms coefficients. By analyzing an obtained set of transformed coefficients 406, we can estimate the cut-off frequencies that fully describe the pattern of the film grain. Those cut-off frequencies are embedded in the bitstream via SEI messages and they are used at the decoder side to simulate film grain as previously described, for example as specified in SMPTE-RDD5. Although, the process of analyzing transformed blocks to estimate cut-off frequencies is out of the scope of the present principles and blocks 405 and 406 are present for illustrative purpose. Film grain analysis and parameter estimation (as with synthesis) typically occur independently for each color component.

Thus, the film grain analysis and parameter estimation advantageously provide to the synthesis part information about the film grain so the synthesizer can produce film grain samples that simulate the appearance of the original film grain in the decoder. A new embodiment for automatic film grain analysis and parameter estimation is here in disclosed. The estimated parameters at least comprise the scaling factors.

In the following we provide different embodiments on how scaling factor(s) can be determined from real data, that is from the film grain FG blocks and filtered blocks collected in a preliminary step.

Figure 5:
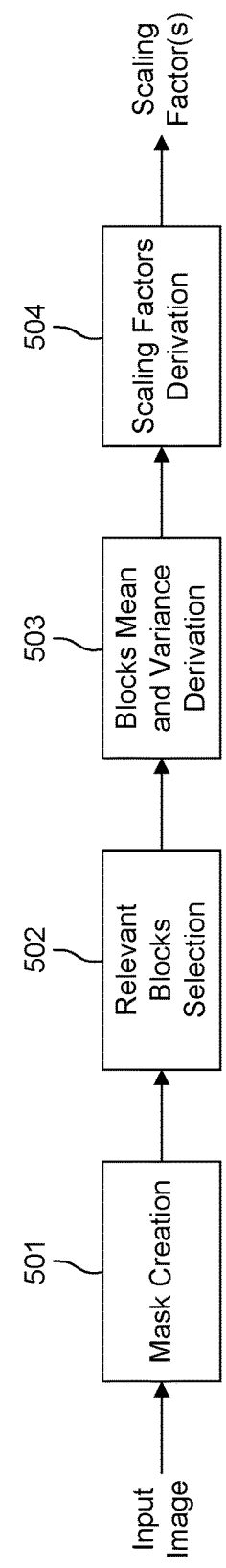
FIG. 5 illustrates a modified block diagram of scaling factor(s) derivation in a video coding/decoding framework according to a general aspect of at least one embodiment.

FIG. 5 illustrates a modified block diagram 500 of scaling factor(s) derivation in a video coding/decoding framework according to a general aspect of at least one embodiment. After the mask creation step (501, corresponding to step 402 in FIG. 4), the relevant blocks (flat) are selected in step 502. The signal mean of the filtered block and variance of each of these FG blocks is derived in step 503 (can be done for each color component). Finally in step 504 the scaling factor(s) are derived from the analysis of the mean and variance of the selected relevant blocks.

In the following, variants embodiments for deriving mean and variance of at least one block (step 503) and variants embodiments for deriving the scaling factor(s) (step 504) are described.

Various Embodiments

To estimate one or more scaling factors, a first step would be to calculate indicative features for each N×M (e.g., 64×64) block that enters the process of film grain parameter estimation (e.g., that is available in step 404). This first step corresponds to step 503.

Thus, for each block that enters to the estimation process we can calculate two features. The first feature is the average value of the image block. Note that the average value is calculated on a block at the given position within the filtered (or reconstructed frame). The second feature is the variance of the film grain FG block, and it is calculated on a block from the film grain image (recall film grain image is the difference between the original and the filtered/reconstructed frame). Note that the average value and variance are taken from two different sources (filtered frame and film grain image) however they must be taken at the same position (coordinates). Hence, we have the average value of the block within an image and the variance of the estimated film grain. Those two features are the main features used in estimating scaling factor(s).

Figure 6:
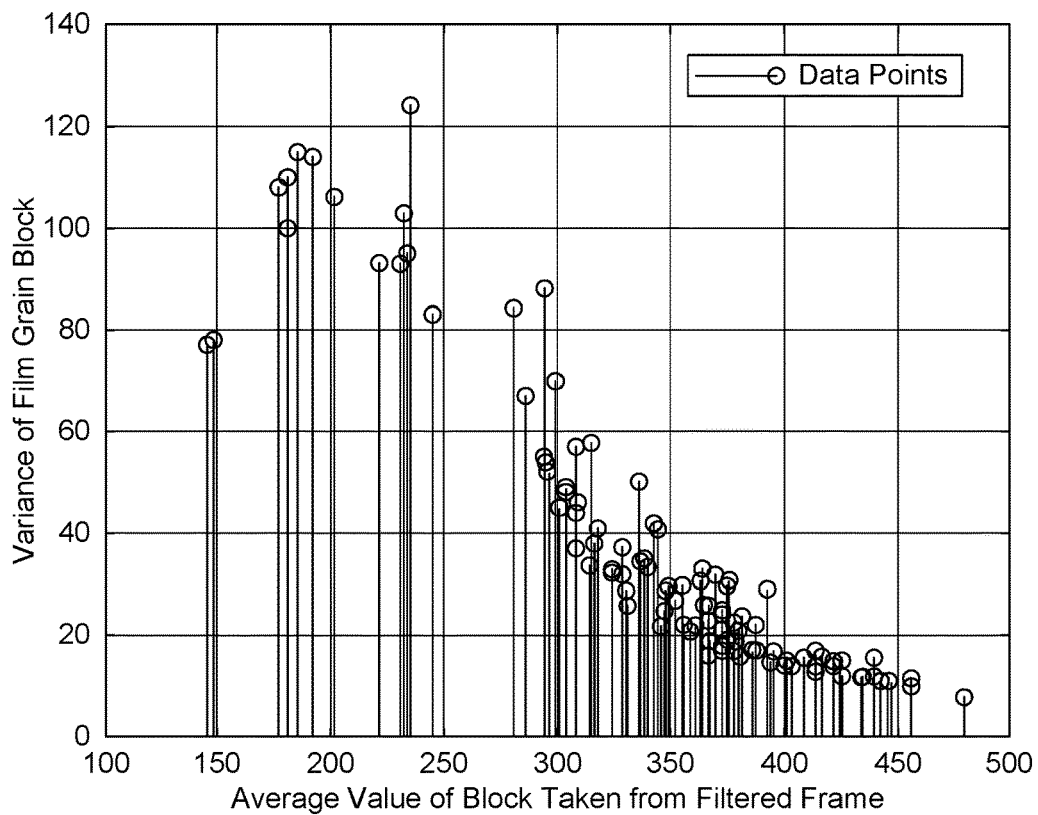
FIGS. 6, 7, 8 and 9 illustrate different variants of scaling factor(s) based on image statistics (average value of the image block without film grain and variance of the film gain block) according to a general aspect of at least one embodiment.

FIG. 6 illustrates a representation of two features, namely the average value of the image block without film grain and the variance of the film gain block according to a general aspect of at least one embodiment. The example in FIG. 6 is given for 10-bit input data. Those data points are afterwards analyzed to calculate film grain scaling factor(s) for different intensity of an input image. Note that even if the source data used in this example is 10-bit, the same methods can be applied for other bit depths. Hence, the methods proposed in this application are not limited by any means to 10-bit input data. Advantageously, the variance of the film grain block serves as a scaling factor (SF) of the film grain block (b' in the above examples) that is synthesized at the decoder since the initial film grain block b' is obtained by using normalized gaussian random distribution.

In the following embodiments, it is assumed that enough data points are collected in the previous step. If number of available data points is less that some predefined level, parameter estimation process can be skipped (but not necessarily since it is implementation decision), and film grain synthesis can be disabled or processed by using default parameters.

In the following embodiments, variants for deriving the scaling factor(s) (step 504) are described.

Figure 7:
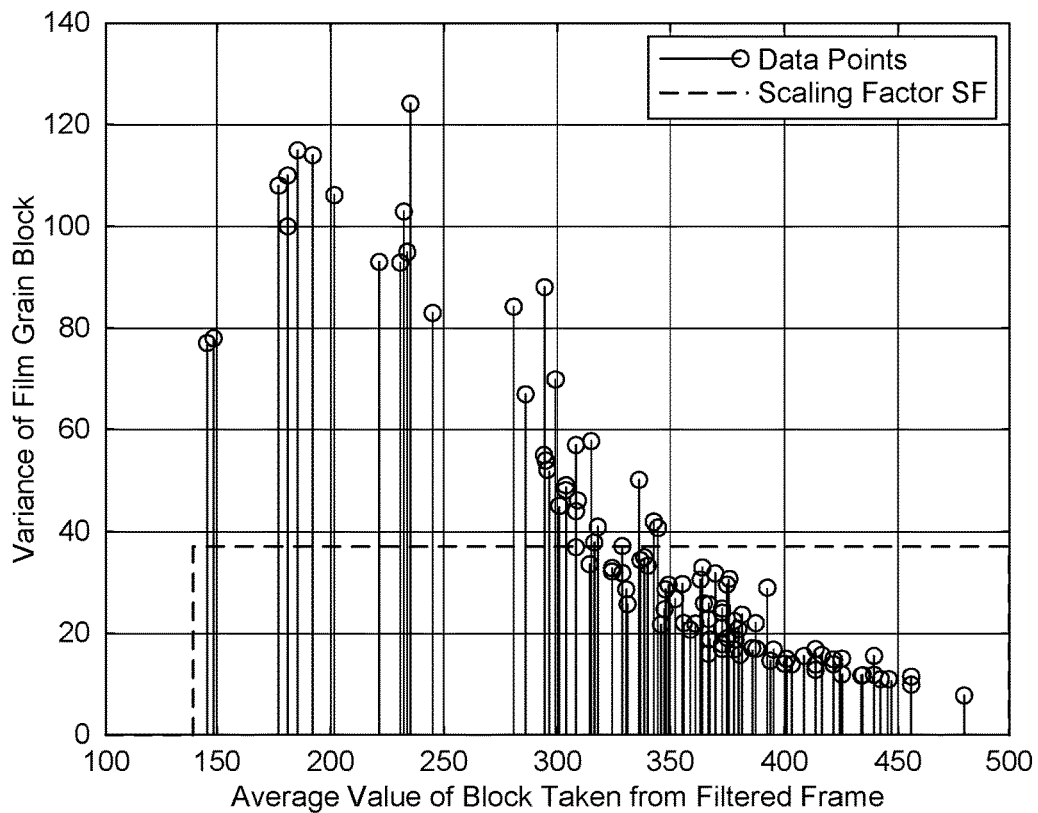

FIG. 7 illustrates a representation of the data points with a single scaling factor and a single intensity interval according to a first set of embodiments. According to a first set of embodiments, a single scaling factor is determined and/or a single intensity interval.

In one embodiment, a single scaling factor is derived by step 504. The average variance over all available data points is calculated:

$$SF = AVG_{var} = \frac{1}{N} * \sum_{i=0}^{N-1} \text{var}_i,$$

where N is the total number of the data points taken from previous step. In that case, one scaling factor is used to cover complete dynamic range-all available intensities (e.g., from 0 to $2^B-1$ where B is bit-depth).

In another embodiment, the complete dynamic range is limited to a subset, however still using only one (constant) scaling factor. The subset can be calculated based on the location of the edge points (edge points along x-axis). For example, in FIG. 6, the complete dynamic range could be limited from 140 (e.g., corresponding to the lower bound of the single intensity interval intensity_interval_lower_bound) to 500 (e.g., corresponding to the upper bound of the single intensity interval intensity_interval_upper_bound). If the average intensity of a block is out of this range, film grain synthesis is not performed on that block. The final result is illustrated in FIG. 7. Advantageously, this embodiment is compatible with the SMPTE-RDD5 model, we can set num_intensity_intervals_minus1 to 0 (meaning that only one intensity interval is used). Note that the SMPTE-RDD5 model is used as an example of the proposed methods, however we are not limited to the given model by any means.

FIG. 7 illustrates a representation of the data points with more scaling factors and more intensity intervals according to a second set of embodiments. According to a second set of embodiments, P intensity intervals are defined for the plurality of image blocks, P being a positive integer larger than one, and a scaling factor is determined for each current intensity interval of the P intensity intervals. Accordingly, more than one intensity interval are defined factors and to derive several scaling are derived in step 504. Hence, num_intensity_intervals_minus1 is non-zero. Each interval is defined with its bounds, intensity_interval_lower_bound and intensity_interval_upper_bound, and intervals cannot overlap. Then, each intensity interval is associated with one constant scaling factor. In any case, scaling factor is calculated as the average value of the variances over the data points that are part of the intensity interval. Note that the given representation of the scaling factor in such cases is equivalent to the piecewise constant function, e.g. as in shown in FIG. 3 or FIG. 7.

In one embodiment, the scaling factor for one interval (or complete dynamic range) is calculated only if the interval is associated with a predefined minimum number of data points.

If the minimum number of data points is not reached, the scaling factor is considered to be a pre-defined value, for instance, 0. In another case, if there are no available points to estimate the scaling factor, scaling factor can be set to the first non-zero scaling factor from the neighboring interval, basically reusing previously calculated scaling factor.

In one embodiment complete dynamic range is divided in predefined number of intensity intervals P. Each interval is of uniform size. Size of an interval is hence given with $2^B/P$ where B is a bit depth of input video, or realRange/P where realRange is the actual range of input image (for instance, for a 10 bit video, it is common that the real range of the signal is [64,960], which is commonly named "standard" or "limited" range, while "full" range corresponds to [0 1023]). Usually P is power of 2. In such a case, each interval is associated with one constant scaling factor representing the average variance over the data points that fall within the interval.

Figure 8:
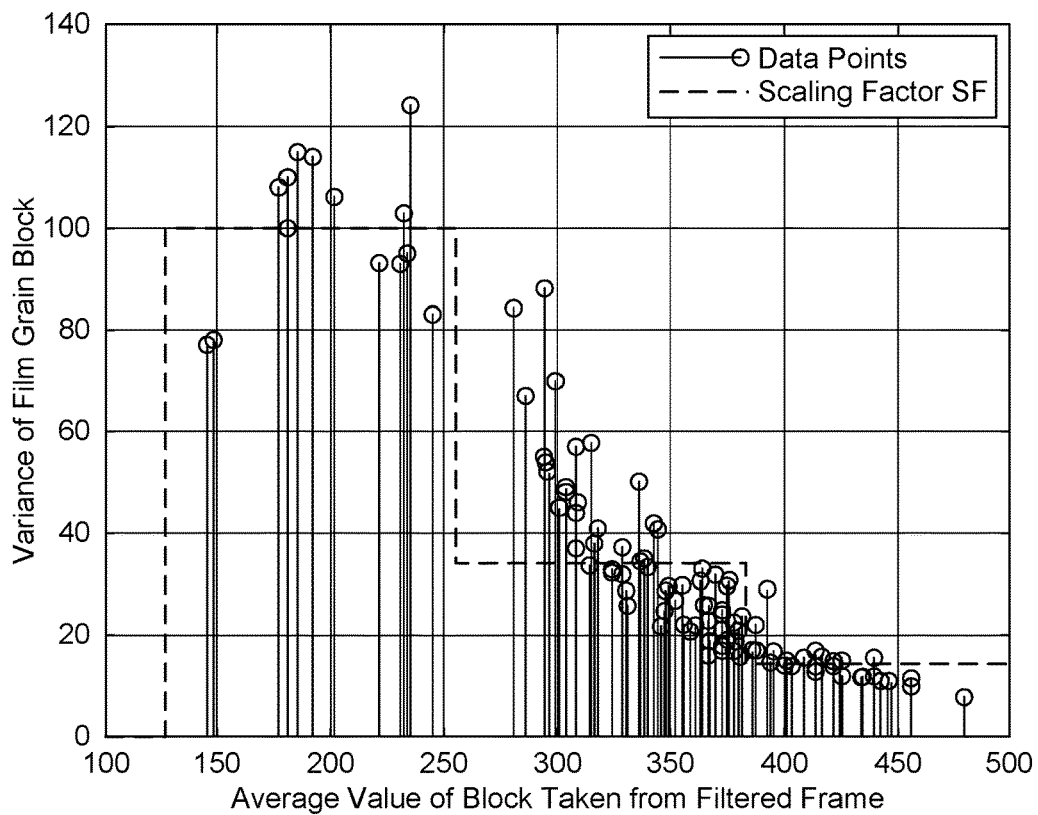

FIG. 8 illustrates a representation of the data points and a representation of scaling factors as a piecewise constant (a.k.a. stepwise) scaling function for P=8 more scaling factors and more intensity intervals according to another embodiment. Intervals without data points are associated with a scaling factor equal to 0 in this example. Several intervals may have a same scaling factor.

In another embodiment, a predefined number P of intensity intervals is used but intervals are of variable size. Boundaries of the intensity interval can be manually set in advance. Scaling factors associated with each intensity interval are calculated as in the previous embodiment. In another embodiment, intervals are derived that that a fixed number of data points is taken within one interval. For example, the number of intervals is calculated as P=T/Q, where T is total number of points within the parameter estimation stage and Q is the predefined number of points within one interval. For example, P can be a non-integer value, and in that case the last interval can have more points than the predefined number Q, ending up with more points.

In one embodiment, the data points are used to fit the function/curve. In this embodiment, step 504 is made of 2 steps:

Step 504a: derive a scaling function by curve fitting

Step 504b: approximate the scaling function by a simplified function (for instance, piece-wise constant function)

Figure 9:
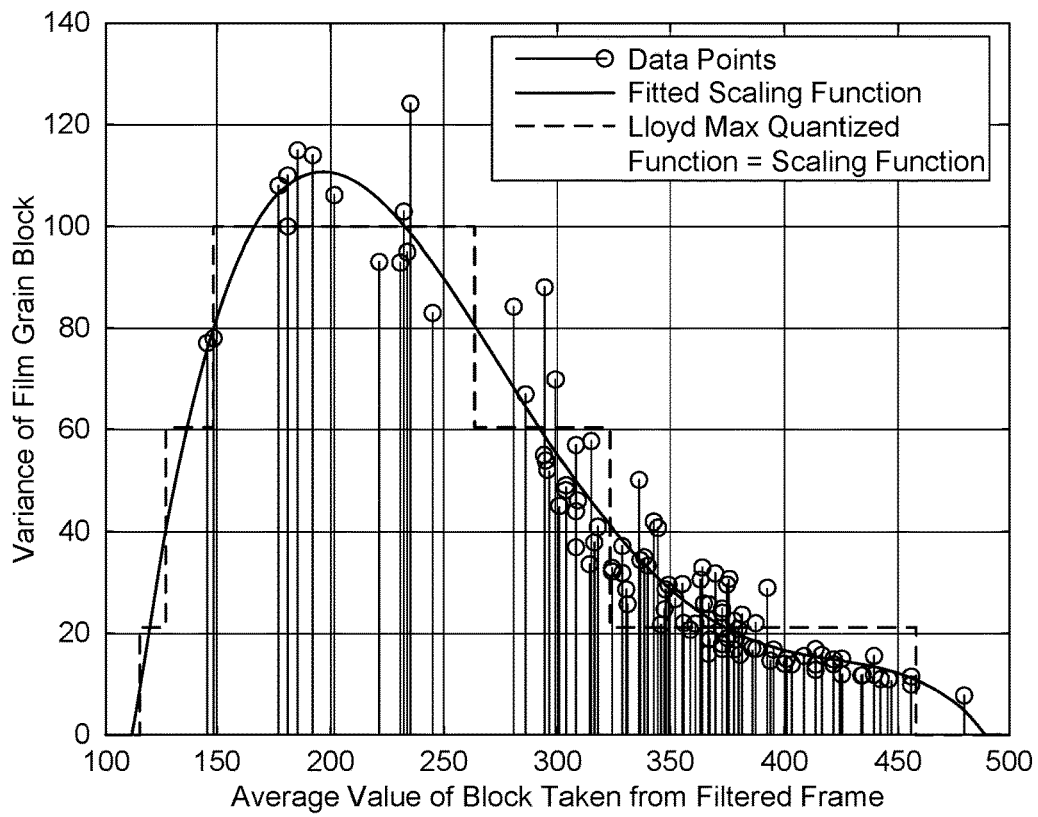

For step 504a, Curve fitting is used—the process to construct the curve or mathematical function that has the best fit to the data points as latter on shown on FIG. 9. This embodiment is not limited to the specific implementation of the curve fitting algorithm. Those algorithms are typically known as polynomial regression or polynomial interpolation. However, any other algorithm available in the related literature can be used at this step to fit the data points to the function/curve. We are not limited to any type of regression or estimation approaches by any means. The fitted function represents the scaling function that is used to scale the film grain block to the proper intensity. For example, all points can be fit with a fourth-order polynomial function. In this way, the coefficients of the polynomial function can be transferred to the decoder as metadata. Based on the received coefficients the encoder can re-calculate the scaling function that is used to scale the film grain block before adding it to the image. Note that the polynomial degree can vary, depending on the required precision. The coefficients of the polynomial function can be quantized or rounded to reduce their coding cost. For instance, considering as example a polynomial function of degree 2, the function is written as $f(x)=a+b.x+c.x.x$, with a,b,c being the coefficients of the function. Instead of directly coding a,b,c, parameters A,B,C can be coded, where A=round(a), B=round(R*b), C=round(R*R*c), where the function round(y) gives the closest integer value of variable y. For example, R is the range of variable x (for instance, R=1024 for a 10-bit variable). Then f(x) can be deduced as round(A+B.x/R+C.x/R.x/R).

In an additional embodiment, other methods to find the relationship among the two variables (average intensity value of the image block without film grain and variance of the film grain block) can be applied.

In another embodiment, we can fit data points to the function/curve and afterwards perform linearization of the curve to P segments. After linearization is applied, we can obtain the breakpoints and proceed to find intensity intervals based on breakpoints. The scaling factor is then calculated for each interval. Breakpoints are interpreted as boundaries of the intensity intervals. For example, breakpoints can be automatically obtained by observing the first and second derivative of the fitted function. After breakpoints are successfully analyzed and are known, intensity intervals can be defined. The scaling factor is then calculated as before, for each intensity interval scaling factor can be calculated as average value of the variances of the points falling in the given interval, finally ending with a piecewise constant function (stepwise function) as illustrated before.

FIG. 9 illustrates a representation of the data points and a representation of scaling factors as a piecewise constant scaling function using curve fitting and Lloyd Max quantizer to quantize the fitted curve according to another embodiment. In this embodiment, the fitted function/curve can be quantized by using any uniform or nonuniform quantizer (quantization scheme) with K quantization levels, e.g., the Lloyd Max quantizer. Available data points are used to train the quantizer resulting in partitions and codebooks. Codebooks are interpreted as scaling factors of the film grain. Quantization based on the obtained quantizer can be applied to the fitted function that is obtained by fitting the available data points, which gives necessary information to obtain intensity intervals and scaling factors for each interval. In this approach the final number of intensity intervals can be different from the number of quantized levels K. The final scaling function is represented as a stepwise function (constant scaling factor within one interval) where the scaling factor is represented with the quantized level of the function. In FIG. 9, an example of curve fitting using 4th polynomial order is represented. The curve is then quantized by using the Lloyd Max quantizer trained on the available data points with K=4 quantization levels. Note that the number of intensity intervals is 7 even if K=4. Note that Lloyd Max quantizer is used as an example, however any other uniform or non-uniform quantization scheme can be used. Also, any method of finding uniform or non-uniform quantization scheme can be used as an additional embodiment.

In previously described embodiments P and K are fixed and known in advance, however the interval size and scaling factors are adapted to the data automatically. In some embodiments, the number of intensity intervals P or quantized levels K can be adaptively chosen as well. For example, we can define the goodness of fit-a function that can tell us if P or K satisfy certain criteria, and we can gradually change them (P or K) to find the one that satisfies the fit criteria in the best manner while at the same time finding the optimal number of intensity intervals. Fit criteria (goodness of fit) can be any criteria that can lead to the optimal P or K for given the set of constrains. Hence, the previously described methods are used in conjunction with the optimization algorithm, to attempt to find the minimum number of intensity intervals or quantization levels that satisfy some constrains. We are not limited to any particular approach on how to automatically optimize P or K. Different approaches can arise at this step as well as different goodness of fit criteria can be applied, e.g., based on implementation cost.

In another embodiment, segmented regression with P segments can be applied directly to the available set of data points, instead of performing linearization of the fitted function/curve. As before, segments (a.k.a. intensity intervals) are separated by breakpoints (turning points of the curve). We can use any algorithm to obtain linear segments (to perform segmented regression), and we are not limiting to any particular approach. After segments and breakpoints are obtained by segmented regression, the analysis is similar as in the previous embodiments. For example, breakpoints can be automatically obtained by observing the first and second derivative of the segmented function. Breakpoints are used as interval borders, and scaling factor is calculated by using data points that fall within the interval. As before, final scaling function is represented as a stepwise function (constant scaling factor within one interval).

In another embodiment, all available data points are subject to clusterization or classification process. Any method from prior art can be used for this purpose. Based on the clusterization/classification results, each point is associated with one cluster/class. The edge points of a cluster (group of points assigned with the same label) are used to calculate cluster boundaries—namely representing interval boundaries. Additional postprocessing and optimization of the results can apply in order to adjust intensity interval boundaries, to optimize the final number of clusters, etc. Note that final number of clusters will typically lead to the final number of intensity intervals. For example, average variance is calculated using the data points within one cluster, and that value represents film grain scaling factor for that interval. As before, final scaling function is represented as a stepwise function (constant scaling factor within one interval—in this case within one cluster). We can use any algorithm capable of providing clustering/classification result, e.g., k-means, hierarchical clustering, decision trees, Gaussian mixture models, or any other partitioning clustering-based method, neural networks and deep learning-based models, etc. In some cases, post-processing of the results obtained from the initial clustering/classification step can be performed to additionally improve the results based on the goodness of fit. Goodness criteria can be any criteria that can lead to the improved result based on the set of constrains, e.g., optimize number of intervals among others.

Note that some of the previous techniques require the predefined number of clusters—meaning predefined number of intensity regions. However, additional processing can be invoked to analyze results provided in the first step. In such way additional optimization can be performed to adaptively chose the final number clusters given the set of constrains and taking care that the goodness of fit criteria is satisfied.

Generic Embodiments

Figure 10:
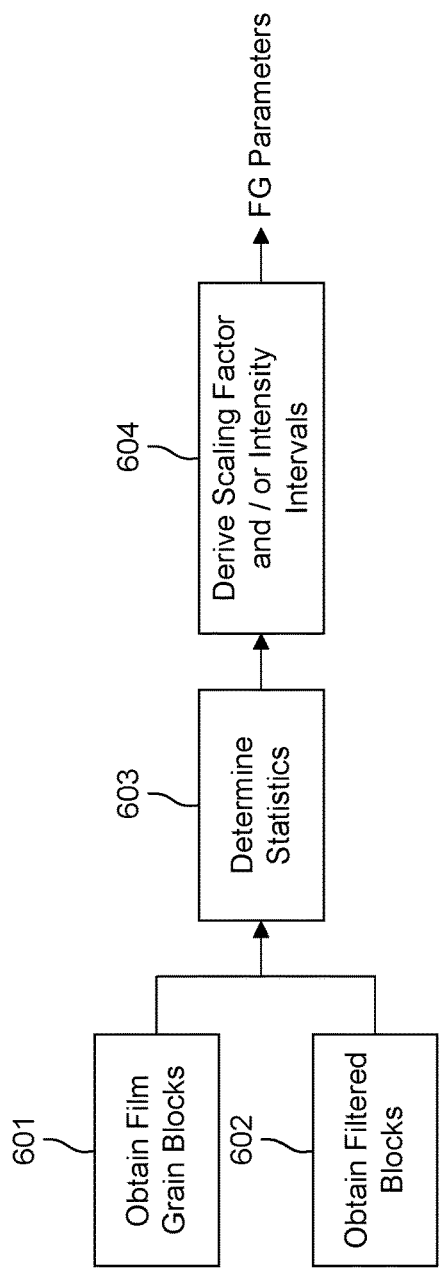
FIG. 10 illustrates a method for estimating film grain parameters according to a general aspect of at least one embodiment.

FIG. 10 illustrates a method for estimating film grain parameters according to a general aspect of at least one embodiment. A generic embodiment encompassing any of the embodiments described above is now presented on FIG. 10. Advantageously, the method 600 corresponds to the step 101 of FIG. 1, and can be implemented in any of the embodiments of the video encoder described hereafter with FIG. 12 or 14. The method 500 of FIG. 5 is a particular embodiment of this generic embodiment. The method 600 estimates film grain parameters for a plurality of image blocks in an image with film grain. For instance, the film grain parameters comprise one or more scaling factors, but the film grain parameters may also comprise a number of intensity intervals, the bounds of intensity intervals, cut-off frequencies, which are non-limiting examples. In a step 601, a plurality of film grain blocks are obtained, a film grain block being representative of a film grain estimate in an image block. As previously described, the original image with film grain might be filtered, and the residual between the original image with film grain and the filtered image results into the film grain image. In a step 602, a plurality of filtered blocks is obtained, a filtered block being representative of an image block without film grain. As previously described, the original image once filtered has the film grain removed. According to another variant, the reconstructed image after encoding is used as a filtered image without film grain. Then in 603, statistics are determined based on the plurality of film grain blocks and on the plurality of filtered blocks. These statistics for instance comprise the variance of the film grain block. These statistics for instance may further comprise the average value of the filtered block, in case the filtered block is not available, the reconstructed image or original image block with film grain can be used to compute the average value or mean. Then, in step 604, at least one scaling factor is determined for the plurality of images blocks in the image based on the statistics. Thus, the scaling factor is adapted to the statistics of the original image, for instance to the level of film grain in the original image, and/or to it intensity. Herein, the image block, the film grain block and the filtered block are located at a same position in the image, and selecting an image block indifferently means selecting the collocated film grain block or filtered block. A block is a part of an image, in the context of film grain, an image block, a film grain block, a filtered block or more generally a block comprises N×M pixels, where M and N are positive integer. According to one embodiment, a mask information for the image is obtained, the mask information comprising for each block of the plurality of image blocks, an indication on whether the image block is flat or not. Then, a subset of the plurality of image blocks can be selected based on the indication that the block is flat; and the scaling factor(s) are determined based on the selected subset of image blocks. Advantageously, this embodiment removes highly textured region of the image from the FG estimation and improves the FG estimation quality. In another optional step, the number of images blocks in the selected subset of image blocks is tested and the FG is estimated only if the number of image blocks to process in the selected subset is higher than a level, otherwise as previously described some default or zeroing FG scaling factors could be applied.

According to another embodiment, a single scaling factor is determined for the plurality of the image blocks and the single scaling factor is an average value of the variance of the plurality of film grain blocks.

According to another embodiment, an intensity interval is further defined and a single scaling factor is determined on a single intensity interval for the plurality of the image blocks. Accordingly, the method determines whether an image block is within the single intensity interval. To do so, the average value of the filtered block at the same location than the image block is tested and in case the average value is higher than a first value (lower intensity interval value) and lower than a second value (higher intensity interval value); the image block belongs to the intensity intervals. Examples of bound value of intensity intervals are given above. Then, the single scaling factor as set as the average value of the variance of the film grain blocks within the single intensity interval, that is the image block at the same position is within the single intensity interval. In a variant, the number of images blocks within the intensity is also tested; the single scaling factor is only determined in case the number of image blocks is higher than a level; otherwise skipped mechanism or default values could be used as previously detailed.

According to yet another embodiment, P intensity intervals are defined for the plurality of image blocks, P being a positive integer larger than one, and a scaling factor is determined for each current intensity interval of the P intensity intervals based on the image blocks belonging to the current intensity intervals. Accordingly, an image block is determined to be within a current intensity interval based on the average value of the filtered block (the average value being higher than a first value, lower current intensity interval value, and lower than a second value, higher current intensity interval value); and the scaling factor for the current intensity interval is the average value of the variance of the film grain blocks (i.e. image blocks) within the current intensity interval. In a variant, the P intensity intervals have a fixed and uniform size with the intensity range (being full intensity range or a limited one). In another variant, the P intensity intervals are of configurable variable sizes. In yet another variant, the size of the P intensity intervals is adjusted to have a same number of image blocks for each of the P intensity intervals.

According to another embodiment, the scaling factors and intensity intervals are values representative of a piece wise constant scaling function. Thus, a scaling function is derived by fitting a curve on the variance of the film grain block being a function of the average value of the filtered block for the plurality of image blocks; the piece wise constant function approximating the scaling function is determined and, wherein the P scaling factors and P intensity intervals are derived from the piece wise constant function (constant level and edge position in the function).

According to yet another embodiment, a scaling function is derived by fitting a curve on the variance of the film grain block being a function of the average value of the filtered block for the plurality of image blocks. Then, the scaling function is quantized with K quantization levels, K being a positive integer resulting into partitions and codewords; and the scaling factors and P intensity intervals are determined based on the code words and partitions as detailed above. Advantageously, the number P of intensity intervals and the number K of quantization levels are adapted to satisfy some constraints.

According to another embodiment, the film grain parameters further comprise at least one cut-off frequencies and the cut-off frequencies are determined for each of the P intensity intervals.

In the following embodiments, other variants related to the film grain usage in the video coding/decoding framework will now be described.

Figure 11:
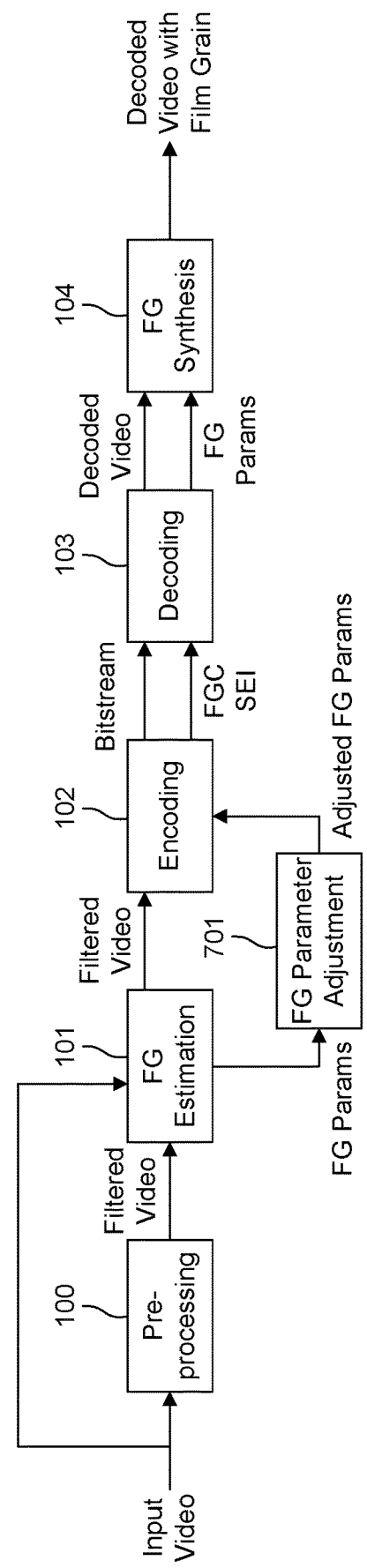
FIG. 11 illustrates a method for estimating film grain parameters in a video coding/decoding framework according to a general aspect of at least one embodiment.

FIG. 11 illustrates a method for estimating film grain parameters according to a general aspect of at least one embodiment. Theses variants are compatible with any of the embodiments previously described. Thus, according to a particular variant, an additional post-processing can be obtained to additionally tune the intensity intervals and scaling factors, e.g., step 701 at FIG. 11. It can, for example, include smoothing of the final scaling function, merging intensity intervals, etc.

If variance is estimated to be 0 for all intensity intervals, or one interval if one is used, it is considered that film grain is not found in the input data. In such case, we can either use some default parameters or we can reuse previously estimated parameters if any (if we still want to synthesize film grain on the decoder side), or we can disable film grain synthesis by using appropriate flags in FGC SEI message.

In addition, once the final scaling scheme/function is obtained for complete dynamic range, additional adjustments of the scaling function can be performed (e.g., within the block 701). In one embodiment, we can adapt scaling function based on QP, based on the position of the currently processed frame in a bitstream, based on the type of the frame, etc. In another embodiment, scaling function can be adapted to better mask compression artifacts. Adaptation of the scaling function can invoke any pre-analysis of the processed frame and analysis of the distortions within the image. Since film grain can be used as a tool to mask compression artifacts, adaptation of the film grain parameters can be applied based on the underlying video and level of the distortion produced by the compression. In such way, within the 701, additional analyses can be performed to tune the film grain parameters to better mask certain artifacts presented in the video. In another embodiment, adaptation of the parameters can be performed on the decoder side instead of the encoder side, for example, after the video is decoded and FG parameters are received.

The same analysis is performed for all color components. It can be applied for any bit-depth. Also, film grain analysis and parameter estimation can be performed on each frame of a video sequence, and each frame can be associated with one FGC SEI message that contains film grain parameters. In another embodiment, film grain analysis and parameter estimation is performed less frequently, e.g., once per GOP. In another embodiment, it can be performed after some time interval, e.g., once per 2 seconds of the video playback. In general, it is implementation choice when and how much frequently to perform film grain analysis and parameter estimation. Even if film grain analysis and parameter estimation is performed less frequently (not on each frame), FGC SEI can be inserted once per frame. In such case film grain parameters are reused until new parameters are estimated. It is obvious that many implementation-oriented approaches may appear, however using the same underlying principles described in this disclosure.

Even cut-off frequencies estimation is not focus of this application, some approaches described here can be useful at this part as well. Once intensity intervals are calculated and are known, by using any of the previously described embodiments or its variants, we can estimate cut-off frequencies on each interval separately. In that way, instead of estimating one pair of cut-off frequencies for the complete dynamic range, we can estimate more than one pair of cut-off frequencies for particular intensity interval. Estimation of the cut-off frequencies can be done as in prior art, e.g., as in the U.S. Pat. No. 7,738,721.

Film grain is becoming more and more popular in video production and video delivery. Current methods are not focusing on the film grain analysis and parameter estimation part to reproduce film grain appearance (shape and/or size-hence film grain pattern) and film grain intensity. Thus, the methods proposed in this application (analysis and estimation of the film grain parameters) is highly beneficial. If we are able to provide such methods, we can resynthesis original look of the film grain. In such way, for example, we are able to recreate artistic intension of video producers. In addition, by using more adaptive scaling factors based on estimated data, film grain can be more adaptively adjusted to the local image characteristics. Also, it can be adaptively updated through the video sequence instead of using one fixed set of scaling parameters through all the video (since video characteristics, e.g., intensity and lighting conditions, can change over the sequence). For example, parameter estimation can be performed once per I-period, giving more flexibility in terms of parameter tuning. This is not possible to do manually. Also, film grain is used to mask compression artifacts and leads to visual quality improvement. In that way, we can adjust film grain intensity estimated in the first place, e.g., based on the QP, and we can fine tune parameters to better mask compression artifacts in addition.

Additional Embodiments and Information

This application describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Figure 12:
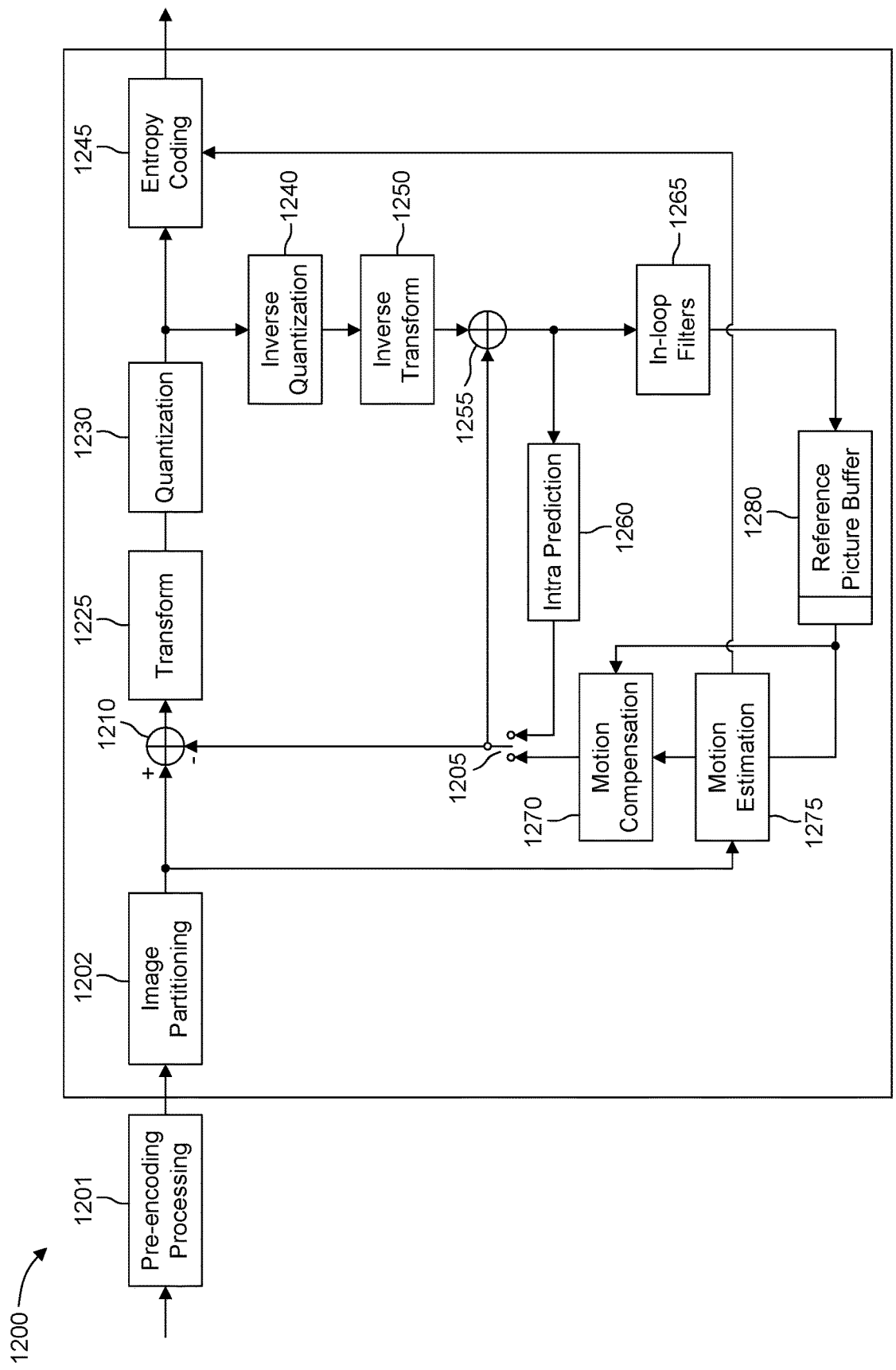
FIG. 12 illustrates a block diagram of an embodiment of video encoder in which various aspects of the embodiments may be implemented.
Figure 13:
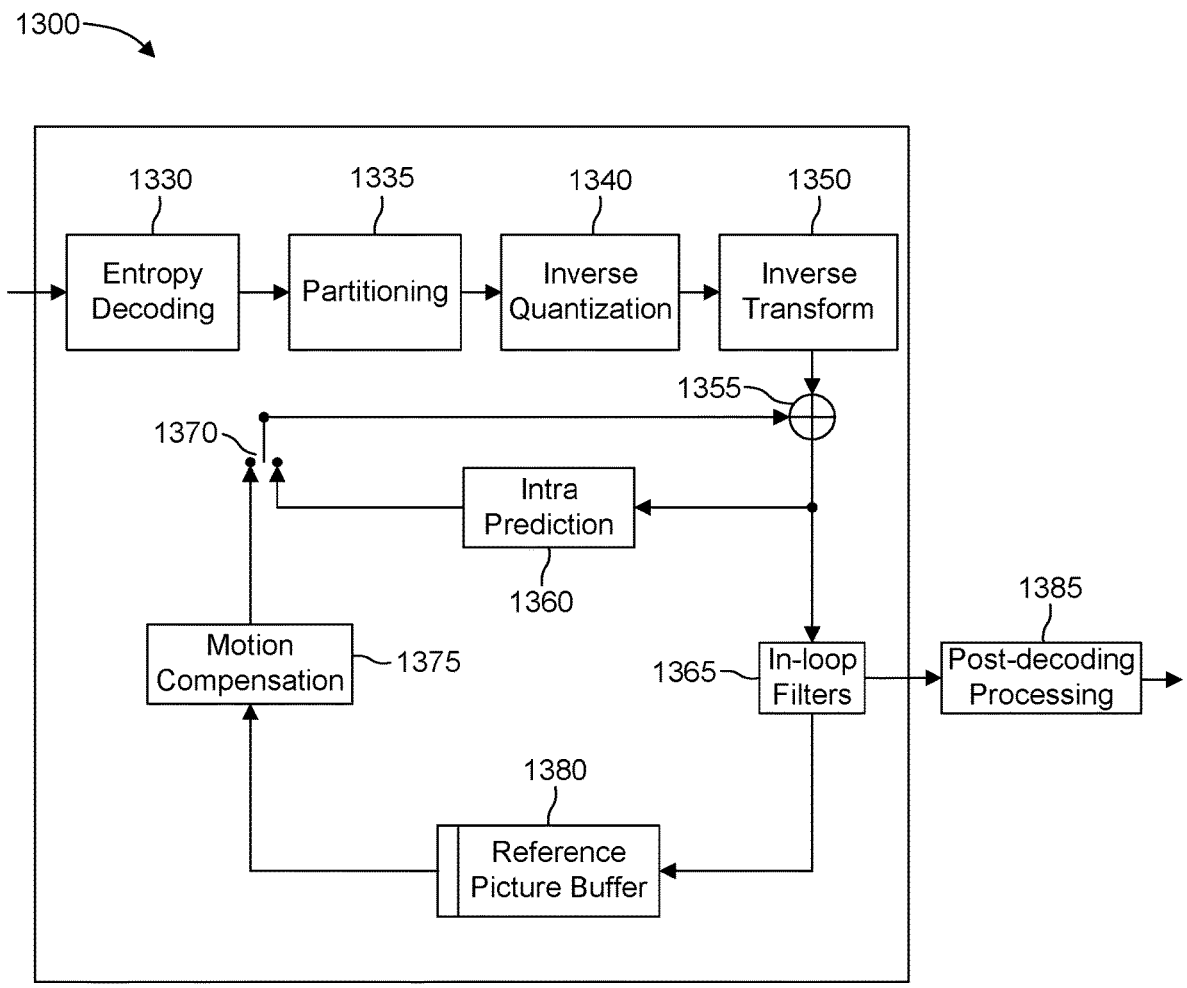
FIG. 13 illustrates a block diagram of an embodiment of video decoder in which various aspects of the embodiments may be implemented.
Figure 14:
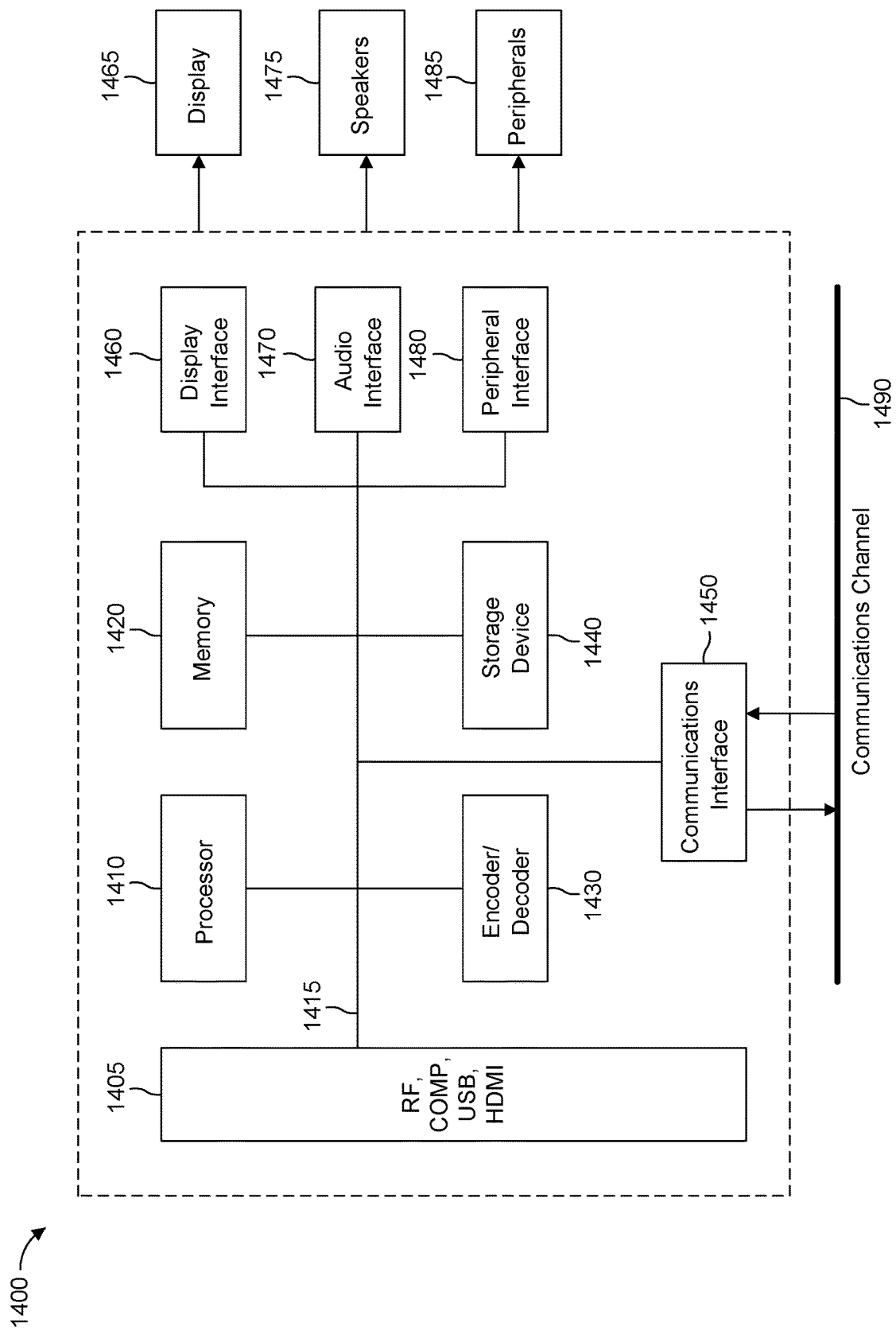
FIG. 14 illustrates a block diagram of an example apparatus in which various aspects of the embodiments may be implemented.

The aspects described and contemplated in this application can be implemented in many different forms. FIG. 12, FIG. 13 and FIG. 14 below provide some embodiments, but other embodiments are contemplated, and the discussion of FIG. 12, FIG. 13 and FIG. 14 does not limit the breadth of the implementations. At least one of the aspects generally relates to film grain in video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably.

Various methods are described herein, and each of the methods comprises one or more steps or actions for achieving the described method. Unless a specific order of steps or actions is required for proper operation of the method, the order and/or use of specific steps and/or actions may be modified or combined. Additionally, terms such as "first", "second", etc. may be used in various embodiments to modify an element, component, step, operation, etc., such as, for example, a "first decoding" and a "second decoding". Use of such terms does not imply an ordering to the modified operations unless specifically required. So, in this example, the first decoding need not be performed before the second decoding, and may occur, for example, before, during, or in an overlapping time period with the second decoding.

Various methods and other aspects described in this application can be used to modify modules, for example, pre-encoding processing module or post-processing decoding module (1201, 1385), of a video encoder 1200 and decoder 1300 as shown in FIG. 12 and FIG. 13. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

Various numeric values are used in the present application, for example, the number of scaling factors, the number of intensity intervals. The specific values are for example purposes and the aspects described are not limited to these specific values.

FIG. 12 illustrates an encoder 1200. Variations of this encoder 1200 are contemplated, but the encoder 1200 is described below for purposes of clarity without describing all expected variations.

Before being encoded, the video sequence may go through pre-encoding processing 1201, for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

In the encoder 1200, a picture is encoded by the encoder elements as described below. The picture to be encoded is partitioned 1202 and processed in units of, for example, CUs. Each unit is encoded using, for example, either an intra or inter mode. When a unit is encoded in an intra mode, it performs intra prediction 1260. In an inter mode, motion estimation 1275 and compensation 1270 are performed. The encoder decides 1205 which one of the intra mode or inter mode to use for encoding the unit, and indicates the intra/inter decision by, for example, a prediction mode flag. Prediction residuals are calculated, for example, by subtracting 1210 the predicted block from the original image block.

The prediction residuals are then transformed 1225 and quantized 1230. The quantized transform coefficients, as well as motion vectors and other syntax elements, are entropy coded 1245 to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized 1240 and inverse transformed 1250 to decode prediction residuals. Combining 1255 the decoded prediction residuals and the predicted block, an image block is reconstructed. In-loop filters 1265 are applied to the reconstructed picture to perform, for example, deblocking/SAO (Sample Adaptive Offset) filtering to reduce encoding artifacts. The filtered image is stored at a reference picture buffer 1280.

FIG. 13 illustrates a block diagram of a video decoder 1300. In the decoder 1300, a bitstream is decoded by the decoder elements as described below. Video decoder 1300 generally performs a decoding pass reciprocal to the encoding pass as described in FIG. 12. The encoder 1200 also generally performs video decoding as part of encoding video data. In particular, the input of the decoder includes a video bitstream, which can be generated by video encoder 1200. The bitstream is first entropy decoded 1330 to obtain transform coefficients, motion vectors, and other coded information. The picture partition information indicates how the picture is partitioned. The decoder may therefore divide 1335 the picture according to the decoded picture partitioning information. The transform coefficients are de-quantized 1340 and inverse transformed 1350 to decode the prediction residuals. Combining 1355 the decoded prediction residuals and the predicted block, an image block is reconstructed. The predicted block can be obtained 1370 from intra prediction 1360 or motion-compensated prediction (i.e., inter prediction) 1375. In-loop filters 765 are applied to the reconstructed image. The filtered image is stored at a reference picture buffer 1380.

The decoded picture can further go through post-decoding processing 1385, for example, an inverse color transform (e.g. conversion from YCbCr 4:2:0 to RGB 4:4:4) or an inverse remapping performing the inverse of the remapping process performed in the pre-encoding processing 1201. The post-decoding processing can use metadata derived in the pre-encoding processing and signaled in the bitstream.

FIG. 14 illustrates a block diagram of an example of a system in which various aspects and embodiments are implemented. System 1400 can be embodied as a device including the various components described below and is configured to perform one or more of the aspects described in this document. Examples of such devices include, but are not limited to, various electronic devices such as personal computers, laptop computers, smartphones, tablet computers, digital multimedia set top boxes, digital television receivers, personal video recording systems, connected home appliances, and servers. Elements of system 1400, singly or in combination, can be embodied in a single integrated circuit (IC), multiple ICs, and/or discrete components. For example, in at least one embodiment, the processing and encoder/decoder elements of system 1400 are distributed across multiple ICs and/or discrete components. In various embodiments, the system 1400 is communicatively coupled to one or more other systems, or other electronic devices, via, for example, a communications bus or through dedicated input and/or output ports. In various embodiments, the system 1400 is configured to implement one or more of the aspects described in this document.

The system 1400 includes at least one processor 1410 configured to execute instructions loaded therein for implementing, for example, the various aspects described in this document. Processor 1410 can include embedded memory, input output interface, and various other circuitries as known in the art. The system 1400 includes at least one memory 1420 (e.g., a volatile memory device, and/or a non-volatile memory device). System 1400 includes a storage device 1440, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 1440 can include an internal storage device, an attached storage device (including detachable and non-detachable storage devices), and/or a network accessible storage device, as non-limiting examples.

System 1400 includes an encoder/decoder module 1430 configured, for example, to process data to provide an encoded video or decoded video, and the encoder/decoder module 1430 can include its own processor and memory. The encoder/decoder module 1430 represents module(s) that can be included in a device to perform the encoding and/or decoding functions. As is known, a device can include one or both of the encoding and decoding modules. Additionally, encoder/decoder module 1430 can be implemented as a separate element of system 1400 or can be incorporated within processor 1410 as a combination of hardware and software as known to those skilled in the art.

Program code to be loaded onto processor 1410 or encoder/decoder 1430 to perform the various aspects described in this document can be stored in storage device 1440 and subsequently loaded onto memory 1420 for execution by processor 1410. In accordance with various embodiments, one or more of processor 1410, memory 1420, storage device 1440, and encoder/decoder module 1430 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 1410 and/or the encoder/decoder module 1430 is used to store instructions and to provide working memory for processing that is needed during encoding or decoding. In other embodiments, however, a memory external to the processing device (for example, the processing device can be either the processor 1410 or the encoder/decoder module 1430) is used for one or more of these functions. The external memory can be the memory 1420 and/or the storage device 1440, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 1400 can be provided through various input devices as indicated in block 1405. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High-Definition Multimedia Interface (HDMI) input terminal. Other examples, not shown in FIG. 12, include composite video.

In various embodiments, the input devices of block 1405 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1400 to other electronic devices across USB and/or HDMI connections. It is to be understood that various aspects of input processing, for example, Reed-Solomon error correction, can be implemented, for example, within a separate input processing IC or within processor 1410 as necessary. Similarly, aspects of USB or HDMI interface processing can be implemented within separate interface ICs or within processor 1410 as necessary. The demodulated, error corrected, and demultiplexed stream is provided to various processing elements, including, for example, processor 1410, and encoder/decoder 1430 operating in combination with the memory and storage elements to process the data stream as necessary for presentation on an output device.

Various elements of system 1400 can be provided within an integrated housing, Within the integrated housing, the various elements can be interconnected and transmit data therebetween using suitable connection arrangement 1415, for example, an internal bus as known in the art, including the Inter-IC (12C) bus, wiring, and printed circuit boards.

The system 1400 includes communication interface 1450 that enables communication with other devices via communication channel 1490. The communication interface 1450 can include, but is not limited to, a transceiver configured to transmit and to receive data over communication channel 1490. The communication interface 1450 can include, but is not limited to, a modem or network card and the communication channel 1490 can be implemented, for example, within a wired and/or a wireless medium.

Data is streamed, or otherwise provided, to the system 1400, in various embodiments, using a wireless network such as a Wi-Fi network, for example IEEE 802.11 (IEEE refers to the Institute of Electrical and Electronics Engineers). The Wi-Fi signal of these embodiments is received over the communications channel 1490 and the communications interface 1450 which are adapted for Wi-Fi communications. The communications channel 1490 of these embodiments is typically connected to an access point or router that provides access to external networks including the Internet for allowing streaming applications and other over-the-top communications. Other embodiments provide streamed data to the system 1400 using a set-top box that delivers the data over the HDMI connection of the input block 1405. Still other embodiments provide streamed data to the system 1400 using the RF connection of the input block 1405. As indicated above, various embodiments provide data in a non-streaming manner. Additionally, various embodiments use wireless networks other than Wi-Fi, for example a cellular network or a Bluetooth network.

The system 1400 can provide an output signal to various output devices, including a display 1465, speakers 1475, and other peripheral devices 1485. The display 1465 of various embodiments includes one or more of, for example, a touchscreen display, an organic light-emitting diode (OLED) display, a curved display, and/or a foldable display. The display 1465 can be for a television, a tablet, a laptop, a cell phone (mobile phone), or other device. The display 1465 can also be integrated with other components (for example, as in a smart phone), or separate (for example, an external monitor for a laptop). The other peripheral devices 1485 include, in various examples of embodiments, one or more of a stand-alone digital video disc (or digital versatile disc) (DVR, for both terms), a disk player, a stereo system, and/or a lighting system. Various embodiments use one or more peripheral devices 1485 that provide a function based on the output of the system 1400. For example, a disk player performs the function of playing the output of the system 1400.

In various embodiments, control signals are communicated between the system 1400 and the display 1465, speakers 1475, or other peripheral devices 1485 using signaling such as AV.Link, Consumer Electronics Control (CEC), or other communications protocols that enable device-to-device control with or without user intervention. The output devices can be communicatively coupled to system 1400 via dedicated connections through respective interfaces 1465, 875, and 1485. Alternatively, the output devices can be connected to system 1400 using the communications channel 1490 via the communications interface 1450. The display 1465 and speakers 1475 can be integrated in a single unit with the other components of system 1400 in an electronic device such as, for example, a television. In various embodiments, the display interface 1465 includes a display driver, such as, for example, a timing controller (T Con) chip.

The display 1465 and speaker 1475 can alternatively be separate from one or more of the other components, for example, if the RF portion of input 1405 is part of a separate set-top box. In various embodiments in which the display 1465 and speakers 1475 are external components, the output signal can be provided via dedicated output connections, including, for example, HDMI ports, USB ports, or COMP outputs.

The embodiments can be carried out by computer software implemented by the processor 1410 or by hardware, or by a combination of hardware and software. As a non-limiting example, the embodiments can be implemented by one or more integrated circuits. The memory 1420 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1410 can be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application, for example, comprising inverse transform.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application, for example, transforming the image block into frequency domain. As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art. Note that the syntax elements as used herein, are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments refer to rate distortion optimization. In particular, during the encoding process, the balance or trade-off between the rate and distortion is usually considered, often given the constraints of computational complexity. The rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of parameters for transform. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

This disclosure has described various pieces of information, such as for example syntax, that can be transmitted or stored, for example. This information can be packaged or arranged in a variety of manners, including for example manners common in video standards such as putting the information into an SPS, a PPS, a NAL unit, a header (for example, a NAL unit header, or a slice header), or an SEI message. Other manners are also available, including for example manners common for system level or application level standards such as putting the information into:

SDP (session description protocol), a format for describing multimedia communication sessions for the purposes of session announcement and session invitation, for example as described in RFCs and used in conjunction with RTP (Real-time Transport Protocol) transmission.

DASH MPD (Media Presentation Description) Descriptors, for example as used in DASH and transmitted over HTTP, a Descriptor is associated to a Representation or collection of Representations to provide additional characteristic to the content Representation.

RTP header extensions, for example as used during RTP streaming, and/or

ISO Base Media File Format, for example as used in OMAF and using boxes which are object-oriented building blocks defined by a unique type identifier and length also known as 'atoms' in some specifications.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

We describe a number of embodiments. Features of these embodiments can be provided alone or in any combination, across various claim categories and types. Further, embodiments can include one or more of the following features, devices, or aspects, alone or in any combination, across various claim categories and types:

Adapting the film grain process in the decoder and/or encoder.

Deriving film grain parameters to apply in a film grain simulating process in the decoder and/or in a film grain estimating process in the encoder.

Signaling an information relative to a film grain process to apply in the decoder.

Deriving an information relative to a film grain process to apply from a film grain information, the deriving being applied in the encoder.

Inserting in the signaling syntax elements that enable the decoder to identify the film grain process to use, such as scaling factors, intensity intervals . . .

Selecting, based on these syntax elements, the at least one scaling factors to apply at the decoder.

A bitstream or signal that includes one or more of the described syntax elements, or variations thereof.

A bitstream or signal that includes syntax conveying information generated according to any of the embodiments described.

Inserting in the signaling syntax elements that enable the decoder to process film grain in a manner corresponding to that used by an encoder.

Creating and/or transmitting and/or receiving and/or decoding a bitstream or signal that includes one or more of the described syntax elements, or variations thereof.

Creating and/or transmitting and/or receiving and/or decoding according to any of the embodiments described.

A method, process, apparatus, medium storing instructions, medium storing data, or signal according to any of the embodiments described.

A TV, set-top box, cell phone, tablet, or other electronic device that performs a film grain process according to any of the embodiments described.

A TV, set-top box, cell phone, tablet, or other electronic device that performs a film grain process according to any of the embodiments described, and that displays (e.g. using a monitor, screen, or other type of display) a resulting image.

A TV, set-top box, cell phone, tablet, or other electronic device that selects (e.g. using a tuner) a channel to receive a signal including an encoded image, and performs a film grain process adapted to core transforms according to any of the embodiments described.

A TV, set-top box, cell phone, tablet, or other electronic device that receives (e.g. using an antenna) a signal over the air that includes an encoded image, and performs a film grain process adapted to core transforms according to any of the embodiments described.

The invention claimed is:

1. A method comprising estimating film grain parameters for a plurality of image blocks in an image with film grain, the film grain parameters comprising at least one scaling factor, wherein the estimating further comprises:
    obtaining a plurality of film grain blocks, a film grain block being representative of a film grain estimate in an image block;
    obtaining a plurality of filtered blocks, a filtered block being representative of an image block without film grain;
    deriving a scaling function by fitting a curve on a variance of the film grain block as a function of an average value of the filtered block for the plurality of image blocks; and
    deriving a piece wise constant function approximating the scaling function using a quantizer, wherein the at least one scaling factor are based on quantization levels of the quantizer, wherein a plurality of intensity intervals is based on a plurality of quantization partitions of the quantizer, and wherein a scaling factor for each intensity interval of the plurality of intensity intervals is representative of a piece of the piece wise constant function approximating the scaling function.

2. The method of claim 1, wherein the quantizer is a non-uniform quantizer.

3. The method of claim 1, wherein the quantizer is a uniform quantizer.

4. The method of claim 2, where the quantizer is non-uniform Lloyd Max quantizer.

5. The method of claim 1, further comprising:
    training the quantizer using the scaling function to determine at least one of the quantization levels or the quantization partitions, and
    applying the trained quantizer to the scaling function to obtain the piece wise constant function.

6. The method of claim 5, wherein the training of the quantizer is iterated on an image basis.

7. The method of claim 5, wherein at least one of a number P of intensity intervals or a number K of quantization levels are fixed.

8. The method of claim 5, wherein the training of the quantizer is iterated with at least one of a number P of intensity intervals or a number K of quantization levels to satisfy some constraints.

9. The method of claim 1, wherein the film grain parameters further comprise one pair of cut-off frequencies for each intensity interval of the plurality of intensity intervals.

10. The method of any of claim 1, wherein the film grain parameters are further adapted to at least one coding parameter used for encoding the image.

11. The method of claim 10, wherein the at least one coding parameter comprises a quantization parameter used for encoding of the image, a position of the image in a video, a type of a prediction used for encoding the image.

12. An apparatus comprising a memory and one or more processors, wherein the one or more processors are configured to estimate film grain parameters for a plurality of image blocks in an image with film grain, the film grain parameters comprising at least one scaling factor, wherein the one or more processors are further configured to:
    obtain a plurality of film grain blocks, a film grain block being representative of a film grain estimate in an image block;
    obtain a plurality of filtered blocks, a filtered block being representative of an image block without film grain;
    derive a scaling function by fitting a curve on a variance of the film grain block as a function of an average value of the filtered block for the plurality of image blocks; and
    derive a piece wise constant function approximating the scaling function using a quantizer, wherein the at least one scaling factor are based on quantization levels of the quantizer, wherein a plurality of intensity intervals is based on a plurality of quantization partitions of the quantizer, and wherein a scaling factor for each intensity interval of the plurality of intensity intervals is representative of a piece of the piece wise constant function approximating the scaling function.

13. The apparatus of claim 12, wherein the quantizer is a non-uniform quantizer.

14. The apparatus of claim 12, wherein the quantizer is a uniform quantizer.

15. The apparatus of claim 13, wherein the quantizer is non-uniform Lloyd Max quantizer.

16. The apparatus of claim 12, wherein the one or processors are further configured to:
    train the quantizer using the scaling function to determine at least one of the quantization levels or the quantization partitions, and
    apply the trained quantizer to the scaling function to obtain the piece wise constant function.

17. The apparatus of claim 16, wherein the training of the quantizer is iterated on an image basis.

18. The apparatus of claim 16, wherein at least one of a number P of intensity intervals or a number K of quantization levels are fixed.

19. The apparatus of claim 16, wherein the training of the quantizer is iterated with at least one of a number P of intensity intervals or a number K of quantization levels to satisfy some constraints.

20. The apparatus of claim 12, wherein the film grain parameters further comprise one pair of cut-off frequencies for each intensity interval of the plurality of intensity intervals.

21. The apparatus of claim 12, wherein the film grain parameters are further adapted to at least one coding parameter used for encoding the image.

22. The apparatus of claim 21, wherein the at least one coding parameter comprises a quantization parameter used for encoding of the image, a position of the image in a video, a type of a prediction used for encoding the image.

* * * * *